(12) United States Patent
Yamasaki et al.

(10) Patent No.: US 6,869,378 B2
(45) Date of Patent: Mar. 22, 2005

(54) SERIES OF MOTORS WITH SPEED REDUCERS

(75) Inventors: Noriyuki Yamasaki, Obu (JP); Kiyoji Minegishi, Aichi (JP); Jun Tamenaga, Obu (JP); Kenichi Kanemitsu, Obu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/380,524

(22) PCT Filed: Sep. 14, 2001

(86) PCT No.: PCT/JP01/08024

§ 371 (c)(1),
(2), (4) Date: Mar. 14, 2003

(87) PCT Pub. No.: WO02/23065

PCT Pub. Date: Mar. 21, 2002

(65) Prior Publication Data

US 2004/0038766 A1 Feb. 26, 2004

(30) Foreign Application Priority Data

Sep. 14, 2000 (JP) ........................ 2000-280277

(51) Int. Cl.$^7$ .............................................. F16H 48/06
(52) U.S. Cl. ........................................................ 475/149
(58) Field of Search ........................................ 475/149

(56) References Cited

U.S. PATENT DOCUMENTS 3,774,477 A * 11/1973 Murphy .................... 475/337
4,811,616 A * 3/1989 Henderson ................ 74/421
6,234,037 B1 * 5/2001 Zimmer .................... 74/421

FOREIGN PATENT DOCUMENTS

| JP | 5-231482 | 9/1993 |
|---|---|---|
| JP | 10-299841 | 11/1998 |
| JP | 2000-110895 | 4/2000 |
| JP | 2000-130529 | 5/2000 |

OTHER PUBLICATIONS

Microfilm of Japanese Utility Model Application No. 170782/1980 (Laid–open No. 93073/1982), Mitsubishi Electric Corporation, Jun. 8, 1982.

* cited by examiner

*Primary Examiner*—Dirk Wright
(74) *Attorney, Agent, or Firm*—Squire, Sanders & Dempsey L.L.P.

(57) ABSTRACT

A series of motors with speed reducers which can meet user demands for reduction ratios or requests for the types of speed reducers with flexibility and reliability and can lower noise and vibration level.

When a plurality of types of speed reducers are combined with motors to make arbitrary motors with speed reducers selectable, a plurality of simple planetary roller units 120 each including a sun roller 121, planetary rollers 122, and a ring roller 123 are provided. The plurality of simple planetary roller units 120 are selected and coupled to covers 110 around the output shafts of the motors to make a plurality of medium-speed motor groups SMC configurable. The plurality of types of speed reducers are selectable and connectable to medium-speed motors of the same size through a carrier 100 for synchronizing with the revolution component of the planetary rollers 122.

29 Claims, 21 Drawing Sheets

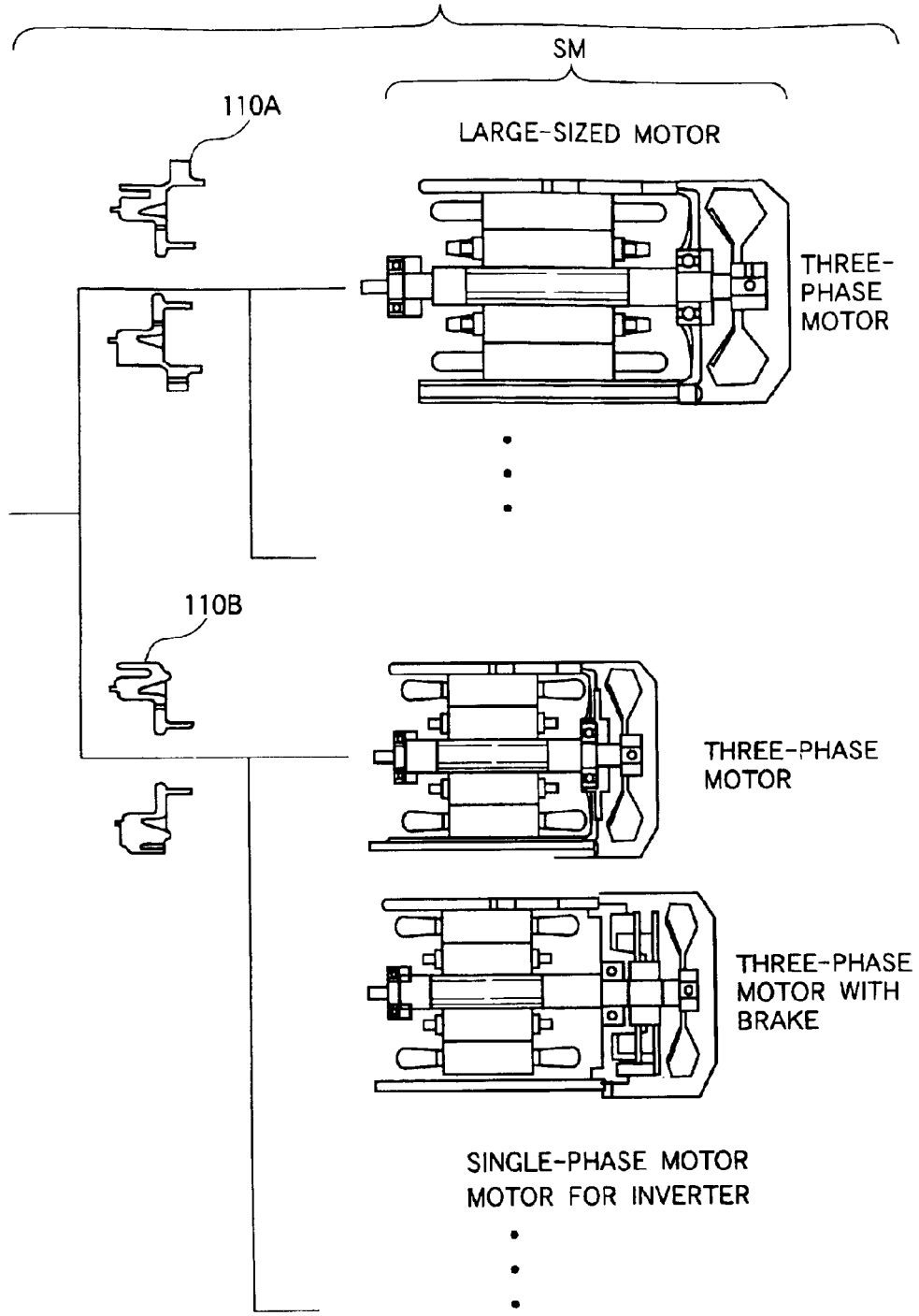

FIG.9

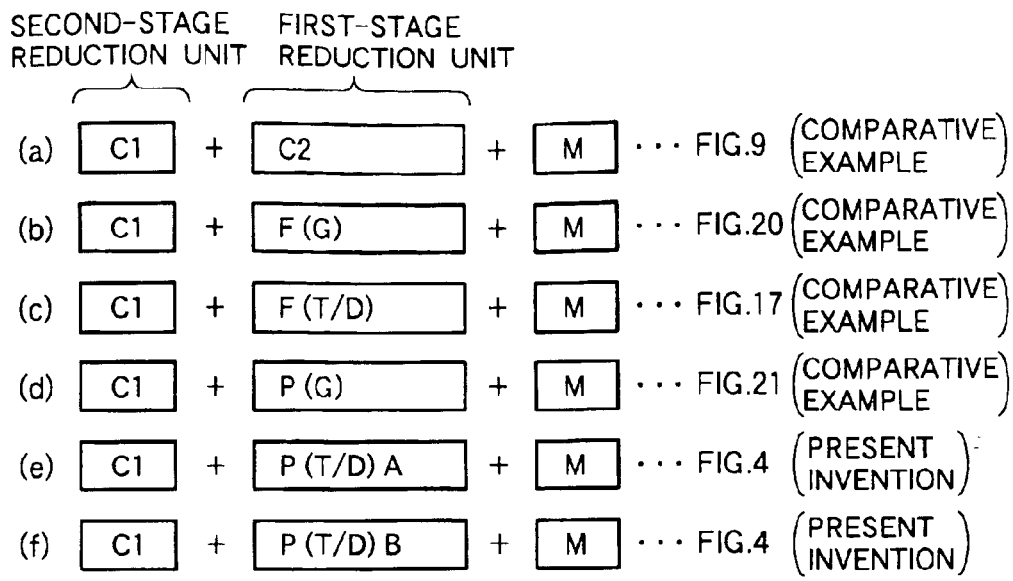

- DESCRIPTION OF SYMBOLS

| | |
|---|---|
| M | ···MOTOR |
| C | ···OSCILLATING INTERNAL MESHING PLANETARY GEAR TYPE |
| F | ···POWER-DISTRIBUTED SHAFT TYPE |
| P | ···SIMPLE PLANETARY TYPE |
| G | ···GEAR TYPE |
| T/D | ···ROLLER-BASED FRICTIONAL TRANSMISSION TYPE |
| C1 | ···REDUCTION STAGE OF OSCILLATING INTERNAL MESHING PLANETARY GEAR TYPE (SUBSEQUENT STAGE) |
| C2 | ···REDUCTION STAGE OF OSCILLATING INTERNAL MESHING PLANETARY GEAR TYPE (PRIOR STAGE) |
| F (G) | ···REDUCTION STAGE OF POWER-DISTRIBUTED SHAFT TYPE (GEAR TYPE) |
| F (T/D) | ···REDUCTION STAGE OF POWER-DISTRIBUTED SHAFT TYPE (ROLLER TYPE) |
| P (G) | ···REDUCTION STAGE OF PLANETARY TYPE (GEAR TYPE) |
| P (T/D) | ···REDUCTION STAGE OF PLANETARY TYPE (ROLLER TYPE) |
| A | ···TYPE IN WHICH ROLLERS ARE RETAINED WITH RETAINERS |
| B | ···TYPE IN WHICH ROLLERS ARE RETAINED WITH NEEDLE BEARINGS AND PINS |

FIG.10

NL : 0% LOAD
FL : 100% LOAD

| MODEL | MOTOR CAPACITY kW | REDUCTION RATIO | INSTALLATION | NOISE VALUE dB(A) | |
|---|---|---|---|---|---|
| | | | | NL | FL |
| (a) C1+C2 + M | 0.2 | 143 | LIGHTWEIGHT BASE | 54.1 | 59.8 |
| | | | FC SURFACE PLATE | 50.0 | 52.8 |
| (b) C1+F (G) + M | 0.2 | 181 | LIGHTWEIGHT BASE | 56.1 | 63.7 |
| | | | FC SURFACE PLATE | — | — |
| (c) C1+F (T/D) + M | 0.2 | 124 | LIGHTWEIGHT BASE | 52.4 | 59.2 |
| | | | FC SURFACE PLATE | — | — |
| (d) C1+P (G) + M | 0.2 | 131 | LIGHTWEIGHT BASE | 54.9 | 70.8 |
| | | | FC SURFACE PLATE | — | — |
| (e) C1+P (T/D) A+ M | 0.2 | 175 | LIGHTWEIGHT BASE | 47.5 | 47.4 |
| | | | FC SURFACE PLATE | 43.8 | 44.7 |
| (f) C1+P (T/D) B + M | 0.2 | 175 | LIGHTWEIGHT BASE | 44.9 | 45.8 |
| | | | FC SURFACE PLATE | 43.7 | 44.1 |
| MOTOR ALONE | 0.2 | — | FC SURFACE PLATE | 42.0 | — |

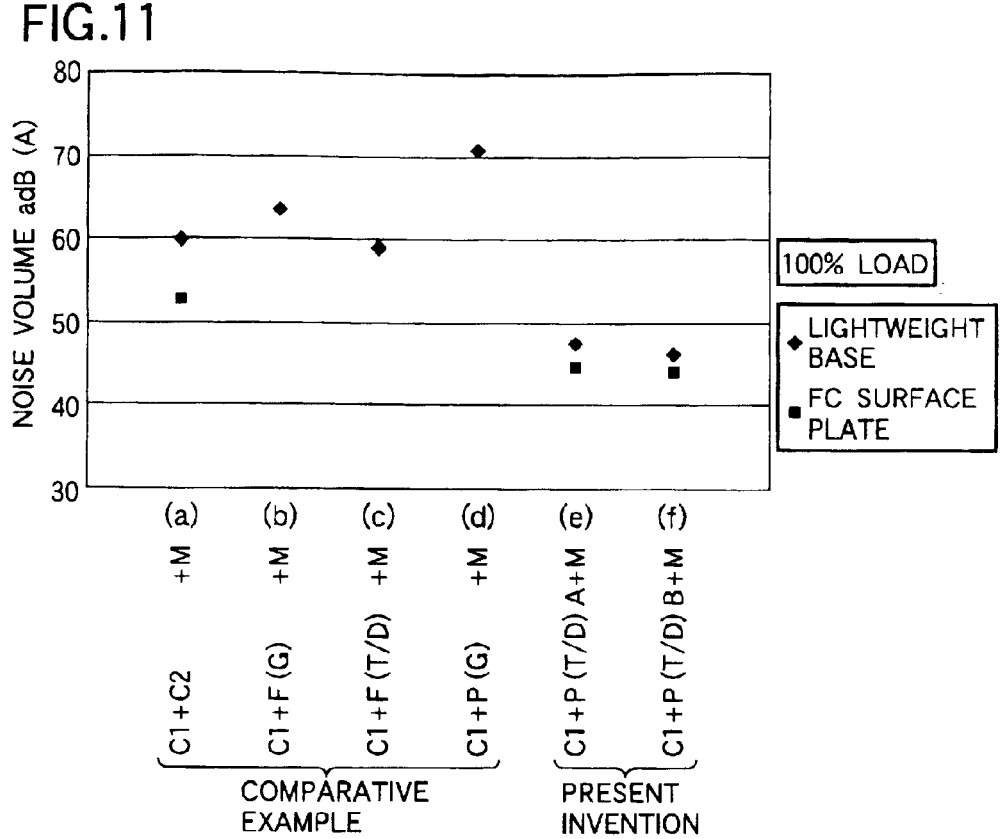

"NO LOAD+LIGHTWEIGHT BASE"

C1+C2+N

C1+F(G)+M

C1+F(T/D)+M

C1+P(G)+M

}COMPARATIVE EXAMPLES

C1+P(T/D)A+N

C1+P(T/D)B+M

}PRESENT INVENTION

"NO LOAD+FC SURFACE BASE"
FIG.13A
C1+C2+M
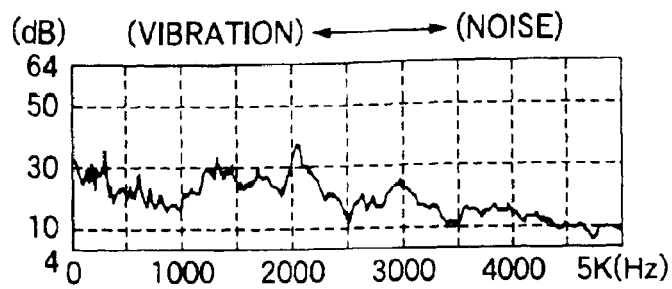
FIG.13B
C1+F(G)+M    NONE
FIG.13C
C1+F(T/D)+M    NONE
FIG.13D
C1+P(G)+M    NONE
COMPARATIVE EXAMPLES
FIG.13E
C1+P(T/D)A+M
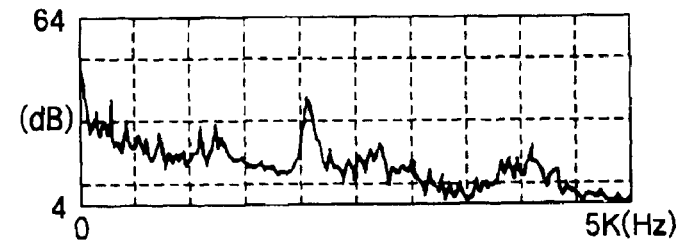
FIG.13F
C1+P(T/D)B+M
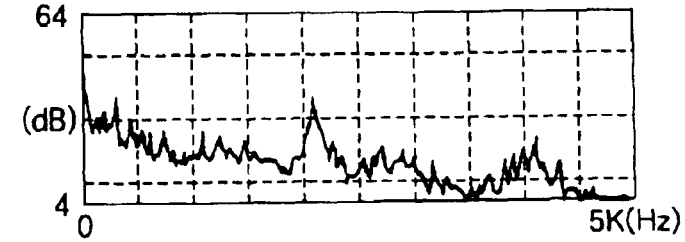
PRESENT INVENTION

"100%LOAD+LIGHTWEIGHT BASE"

C1+C2+M

C1+F(G)+M

C1+F(T/D)+M

C1+P(G)+M

C1+P(T/D)A+M

C1+P(T/D)B+M

"100%LOAD+FC SURFACE PLATE"
FIG.15A
C1+C2+M
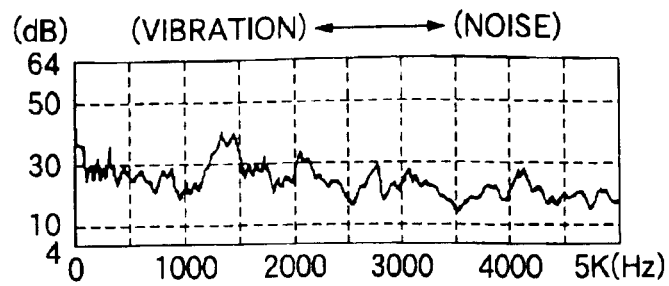
FIG.15B
C1+F(G)+M          NONE
FIG.15C
C1+F(T+D)+M       NONE
FIG.15D
C1+P(G)+M          NONE
} COMPARATIVE EXAMPLES
FIG.15E
C1+P(T/D)A+M
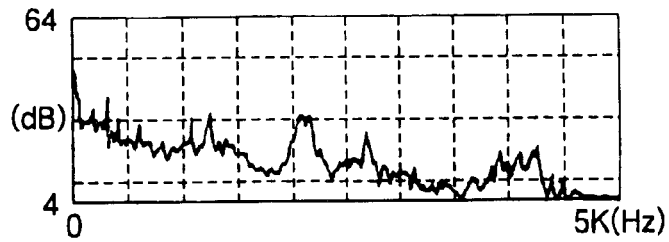
FIG.15F
C1+P(T/D)B+M
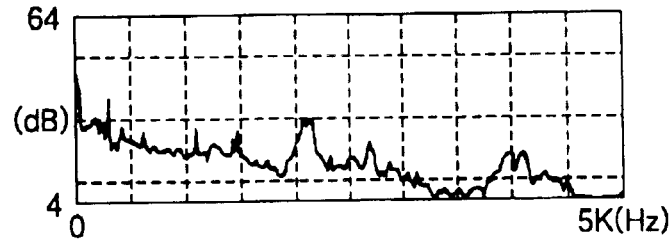
} PRESENT INVENTION

SERIES OF MOTORS WITH SPEED REDUCERS

TECHNICAL FIELD

The invention relates to a series of motors with speed reducers in which a plurality of types of speed reducers are combined with motors to make arbitrary motors with speed reducers selectable.

BACKGROUND ART

Most of the motors with speed reducers of this kind are combinations of motors for generating rotational power and gear type speed reducers for reducing this rotational power in speed. The motors with speed reducers of this kind have the structure of reducing speed mechanically. The motors can thus be operated in most efficient conditions (range of the numbers of rotations), finding wide use in every industrial field.

In this case, most of (eight or more out of ten) prevailing gear type speed reducers are used within the range of 1/10 to 1/60 or so in total reduction ratio. As for the varieties of speed reducers, different types such as simple planetary gear speed reducers, oscillating internal meshing planetary gear speed reducers, bevel type speed reducers, hypoid speed reducers, and worm speed reducers are available in series so as to allow selection according to applications.

By the way, because of using gear type speed reducers, the series of motors with speed reducers of this kind has reduction ratios set at predetermined intervals (common ratios). Consequently, abundant variations of reduction ratios were not always available, and it was sometimes impossible to meet user needs finely.

In addition, each type of speed reducer was specialized in certain ranges of reduction ratios, and there was a limit to extending the range of reduction ratios of each type while suppressing the fabrication costs. Moreover, speed reducers covering higher reduction ratios were generally high in fabrication costs. If driving apparatuses of higher reduction ratios were required, then speed reducers of high-cost types were inevitably selected and combined with motors, which resulted in a problem of limited flexibility in selecting the types of speed reducers.

Aside from these problems, there were other problems that when gear type speed reducers were used, the meshing portions of the gears (in particular, the meshing portions between the input shafts rotating at high speed and the first-stage gears) produced high noise and vibration, and that the resonance between the speed-reducer side and the motor side might often make the overall noise level and vibration level of the motors with speed reducers higher than the noise from the units themselves.

In this regard, detailed description will be given in conjunction with an example of a geared motor that uses a conventionally-known oscillating internal meshing planetary gear structure (gearing corresponding to International Patent Classification F16H 1/32), which tends to cause particularly high noise/vibration levels, as the speed reducer.

FIG. 16 shows the example of the geared motor (a motor with a speed reducer) which includes an oscillating internal meshing planetary gear speed reducer described in Japanese Patent Laid-Open Publication No. Hei 5-231482. This geared motor 1 is an integrated combination of a speed reducer 2 and a motor 3.

The casing 51 of the speed reducer 2 consists of a center casing 52, a joint casing 53 closer to the motor 3, and a front casing 54 opposite from the motor 3. The casing 55 of the motor 3 consists of a cylindrical casing 56, the joint casing 53 closer to the speed reducer 2, and a rear cover 57 opposite from the speed reducer 2. In this case, the above-mentioned joint casing 53 doubles as parts of the casings 51, 55 of the speed reducer 2 and the motor 3. Through the medium of this joint casing 53, the speed reducer 2 and the motor 3 are connected in one.

The speed reducer 2 has a first shaft 11 to be an input shaft and a second shaft 12 to be an output shaft.

Two eccentric bodies 13a and 13b are fitted to the outer periphery of the first shaft 11 with a predetermined phase difference therebetween (180°, in this example). These eccentric bodies 13a and 13b make integral rotation with the first shaft 11. The centers of the eccentric bodies 13a and 13b are off the shaft axis of the first shaft 11 by predetermined eccentricities, respectively. External gears 15a and 15b are fitted to the outer peripheries of the eccentric bodies 13a and 13b, respectively. The external gears 15a and 15b have a plurality of inner pin holes 16a and 16b, respectively. Inner pins 17 are fitted into these inner pin holes 16a and 16b with play.

On the outer peripheries of the external gears 15a and 15b are formed external teeth of trochoidal tooth profile or arc tooth profile, which are in internal mesh with an internal gear 20. The internal gear 20 is integrally formed on the inner periphery of the center casing 52. The individual internal teeth thereof are made of outer pins 21 which are retained on the inner periphery of the center casing 52.

A pair of carriers 23 and 24 is arranged astride the external gears 15a and 15b. Both the carriers 23 and 24 are rotatably supported by bearings 31 and 32, and connected in one by a plurality of carrier pins (coupling pins) 25 and spacers 26.

The inner pins 17 are connected at both ends to the carriers 23 and 24 on both sides so as to be capable of sliding rotation. The rotation components of the external gears 15a and 15b are exclusively transmitted to the carriers 23 and 24 on both sides through the inner pins 17.

One end of the first shaft 11 lies in a center hole 23a in carrier 23 on the motor-3 side, and is connected to a motor shaft 61 through a coupling 70.

Having this configuration, this speed reducer can achieve a speed reduction of from the number of teeth of the external gears 15a, 15b to one by publicly-known actions.

Now, description will be given of another conventional example.

FIGS. 17 and 18 show a conventional geared motor described in Japanese Patent Laid-Open Publication No. Hei 10-299841. This geared motor 500 uses an oscillating internal meshing planetary gear speed reducer of so-called power-distributed shaft type.

This internal meshing planetary gear speed reducer comprises: a first shaft 502 to be connected to an external motor shaft 501; a plurality of power-distributed shafts 503 which are arranged on a circumference concentric with the first shaft 502 and rotate in conjunction with the first shaft 502; eccentric bodies 504 which are arranged on the plurality of power-distributed shafts 503, respectively; an external gear 505 which is arranged so as to be capable of eccentric rotation with respect to the first shaft 502; an internal gear 506 which is installed concentrically with the first shaft 502 and with which the external gear 505 meshes internally while making eccentric rotation about the first shaft 502; and a second shaft 507 coupled to the plurality of power-distributed shafts 503.

In this internal meshing planetary gear structure, the eccentric bodies 504 are arranged so as to lie between a pair of carriers 523 and 524. The power-distributed shafts 503 are rotatably supported by the carriers 523 and 524. Then, a sun roller 511 is arranged on the first shaft 502. A plurality of power-distributed rollers 512, each making external contact with the sun roller 511, are arranged on the plurality of power-distributed shafts 503 through spline connections, respectively. A press-contact ring 513 for the plurality of power-distributed rollers 512 to make internal contact with is arranged outside the power-distributed rollers 512. The press-contact ring 513 in this case is intended merely to produce a press-contacting force between the sun roller 511 and the power-distributed rollers 512, and thus differs from simple planetary rings in function.

Geared motors adopting such internal meshing planetary gear speed reducers as illustrated in the foregoing examples have the advantages of having a simple, compact structure with high rigidity and offering high reduction ratios. Nevertheless, the structure that the external gear(s) oscillates/oscillate while meshing with the mating gear has the problem that the vibration on the speed-reducer side and the vibration on the motor side combine to produce resonance, yielding an inevitable tendency toward higher noise.

More specifically, in the foregoing geared motors, the vibration occurring on the speed-reducer side vibrates the connected motors, and mixes with the vibration generated by the motors themselves to produce complex resonance. Moreover, the vibration sometimes returns to the originating speed reducers for more complex resonance, which might result in the production of higher noise from the entire geared motors on rare occasions.

In this regard, for the case of the geared motor 1 of FIG. 16, the motor shaft 61 and the first shaft 11 are in floating connection through the coupling 70 of spline type. Thereby, the vibration of the motor unit 3 itself and the vibration of the speed reducer 2 itself are blocked from mutual transmission, thereby preventing the two sides from producing resonance.

Merely establishing the floating connection through the coupling 70, however, could not suppress the mutual transmission of the vibrations significantly, and hence a sufficient noise reduction effect was not obtained.

Moreover, even in the geared motor adopting the internal meshing planetary gear structure of power-distributed shaft type of FIG. 17, the noise reduction effect as much as has been expected was not obtained in actual operation. The possible reason is as follows:

That is, in the structure of this power-distributed shaft type, the individual power-supply shafts 503 undergo vibration and deflection due to the oscillating movement of the external gear 505. The power-distributed shafts 503 are therefore quite likely to vibrate and deform (deflect) under the loads from this external gear 505. Meanwhile, in this geared motor, the power-distributed rollers 512 which make press-contact with the sun roller 511 exist on those power-distributed shafts 503. Consequently, the vibration and deformation of the power-distributed shafts 503 can be transmitted to the power-distributed rollers 512→ the sun roller 511 directly, thereby hindering the effect of blocking vibration transmission which originates from the use of the friction rollers. In other words, the cause seems to consist in that the rollers 512 suited to high-speed low-torque power transmission are arranged directly on the power-distributed shafts 503 which undergo the direct effect of deformation due to the load transmission in the internal meshing planetary gear structure.

In any case (leaving the cause aside), the foregoing two examples, despite the adoption of the floating connection and the incorporation of the friction rollers, have not gone far enough to achieve such a noise improving effect as renews the established ideas of geared motors.

In regard to such increases in noise and vibration level, the use of the other types of speed reducers also ended up with similar results.

DISCLOSURE OF THE INVENTION

The present invention has been achieved in view of the foregoing problems, and it is thus an object thereof to provide a series of driving apparatuses which can meet user demands for reduction ratios or requests for the types of speed reducers with flexibility and reliability and can lower noise and vibration level.

The invention of claim 1 is a series of motors with speed reducers having a plurality of types of speed reducers combined with motors to make arbitrary motors with speed reducers selectable, the series comprising a plurality of simple planetary roller mechanisms each including a sun roller, a planetary roller for rolling around the sun roller, and a ring roller for the planetary roller to make internal contact with, the plurality of simple planetary roller mechanisms being selected and coupled to covers around output shafts of the motors to make a plurality of medium-speed motor groups configurable, the plurality of types of speed reducers being selectable and connectable to medium-speed motors of the same size through a carrier for synchronizing with the revolution component of the planetary roller. Thereby, the foregoing problems have been solved.

The most essential requirements in these motors with speed reducers are that the plurality of simple planetary roller mechanisms be selected and coupled to the covers around the output shafts of certain motors to make a plurality of medium-speed motor groups substantially configurable, and that the plurality of types of speed reducers be freely selectable and connectable to medium-speed motors of the same size.

Here, "the medium-speed" means a speed which corresponds between 300 rpm and 900 rpm.

When the medium-speed motor groups are substantially configurable like this by the addition of the simple planetary roller mechanisms, it is possible to reduce the burden on the speed-reducer side and ease restrictions on selection.

More specifically, for one thing, the simple planetary roller mechanisms can achieve a first-stage reduction, and therefore the reduction ratios on the speed-reducer side can be set smaller with margins accordingly. For example, in the cases of attaining total reduction ratios of $1/10$ to $1/60$, the simple planetary roller mechanisms can provide reduction ratios of $1/3$ to $1/8$, or typically $1/4$ to $1/6$ or so. Then, the speed-reducer side need not bear anything but reduction ratios around $1/2$ to $1/10$, which facilitates the selection of the speed reducers. In addition, since the simple planetary roller mechanisms can achieve the first-stage reduction, the range of total reduction ratios can also be extended. Besides, the simple planetary roller mechanisms can be fine adjusted in reduction ratio easily by changing the diameter ratios of the respective rollers. This allows a wider variation of reduction ratios.

For another, due to the exertion of the first-stage reducing function by the simple planetary roller mechanisms, the input rotation speed to the speed reducers can be set lower. Consequently, aside from the lower noise production at the high-speed part (first stage) realized by the simple planetary roller mechanisms, a significant reduction can be made of the noise/vibration level arising from the speed reducers, or low-speed part. Additionally, because of the interposition of the simple planetary roller mechanisms between the speed reducers and the motors, vibrations that are being transmitted between the speed reducers and the motors (in particular, vibration in the rotational direction and vibration in the axial direction) can be absorbed by the mutual contact of the rollers in the simple planetary roller mechanisms.

As a result, it is possible to avoid complex resonance phenomena occurring from the transmission of vibration between the speed reducers and the motors, thereby allowing a reduction (far beyond expectation) in the overall noise/vibration levels caused by the motors with speed reducers.

In short, combining the simple planetary roller mechanisms with the motors to form "medium-speed motors" can effectively suppress both the transmission of vibration from the speed reducers to the motors and the transmission of vibration from the motors to the speed reducers, which were conventionally inevitable, and can prevent resonance with the result of a reduction in overall noise.

Here, the present invention uses simple planetary roller mechanisms as the speed reducers to be combined with the motors.

That is, simple planetary roller mechanisms transmit rotational power by friction on the contact surfaces of (a plurality of) rollers by means of the power transmission structure unique to the simple planetary roller mechanisms, which involves rotation and revolution of their planetary rollers. Then, the individual contact surfaces quite favorably absorb the vibrations that are being mutually transmitted between the speed reducers and the motors on both sides of the simple planetary roller mechanisms (in particular, vibration in the rotational direction and vibration in the axial direction).

The foregoing power-distributed shaft type of FIG. 17 also used friction rollers. Nevertheless, the power-distributed shaft type has no simple planetary roller mechanism, and the power-distributed rollers 512 sandwiched between the sun roller 511 and the press-contact ring 513 structurally tend to pick up the vibration of the power-distributed shaft 503 by themselves. On that account, the vibration or deformation of the power-distributed shafts 503 can shift the power-distributed rollers 512 in position or vibrate the power-distributed rollers 512, thereby hampering proper (without-speed-variation) power transmission with the sun roller 511. The result was that the vibration of the power-distributed rollers 512 itself affected the overall vibration and noise, let alone exercised the vibration absorbing function at the frictional contact surfaces.

In other words, this apparatus was not originally based on the concept of resonance avoidance. Thus, it had the configuration that the vibration from the power-distributed shafts 503 was transmitted to the power-distributed rollers 512→ the sun roller 511 directly, lacking a structure for achieving the object of the present invention to avoid resonance by suppressing vibration transmission.

Consequently, despite the incorporation of the friction rollers, the noise improving effect has not been achieved enough to renew the established ideas of geared motors. This has resulted in the belief that "friction rollers can only offer such an effect at best," and the development had been discontinued without further scrutiny.

On the contrary, in the case of the present invention in which a simple planetary roller mechanism is interposed between the speed reducer and the motor, the power transmission is effected by the relative movements among three parties, or the sun roller on the inner side, the ring roller on the outer side, and the planetary rollers interposed therebetween (instead of performing the direct power transmission by means of the rotations of the power-distributed shafts themselves). This eliminates the possibility of undergoing unnecessary deformation and vibration from the oscillating internal meshing planetary gear speed reducer directly as if the power-distributed rollers described above do.

Therefore, even though interposed between the sun roller and the ring roller, the planetary rollers make rolling contact alone with the sun roller and the ring roller under a pressure necessary for frictional transmission, with little pressure variations on the frictional contact surfaces. As a result, the vibration transmission through the simple planetary roller mechanism is suppressed. In addition, since the frictional contact surfaces effectively exercise the vibration absorbing function as described above, they suppress the mutual vibration transmission between the speed reducer and the motor, thereby providing a significant effect for noise reduction.

Moreover, due to the adoption of the simple planetary roller mechanism, the input part and output part of the mechanism can be arranged coaxially. Thus, for example, the coupling part of the sun roller and the motor and the coupling part with the speed reducer via a carrier can be arranged on the same axis.

This coaxiality, in particular, means a structure in which the above-mentioned loads from the external gear affect only a single shaft at the center of the speed reducer (unlike the power-distributed shaft type). This is beneficial in that the overall rigidity can be made higher by merely enhancing the rigidity of this portion.

It is also beneficial in terms of vibration interception because when, for example, a speed reducer of oscillating internal meshing planetary gear type and a motor are connected to constitute a motor with a speed reducer, the vibration from the external gear can be concentrated on a single high-speed shaft and this high-speed shaft can be coupled to one end of the simple planetary roller mechanism to complete the coupling with the simple planetary roller mechanism.

That is, the structure, despite being simple and compact, can be increased in rigidity with an advantage of capability to transmit accordingly higher torque. The structure is also advantageous in terms of noise reduction.

Furthermore, this coaxiality is also beneficial in that the present invention can be easily applied to a geared motor that has such a configuration that the drive shaft of the motor and the input and output shafts on the speed-reducer side align on a single center axis. For example, the simple planetary roller mechanism mentioned before can be added to between the motor 3 and the oscillating internal meshing planetary gear speed reducer 2 of the conventional geared motor 1 shown in FIG. 16 to easily realize a motor with a speed reducer which is included in the series of the present invention. Then, in the geared motor 1 of FIG. 16, the motor shaft 61 and the first shaft 11 of the oscillating internal meshing planetary gear unit 2 are coupled by the coupling 70. This coupling 70 can be diverted to couple the planetary rollers of the simple planetary roller mechanism and the speed reducer via a carrier, or to couple the shaft of the sun roller and the drive shaft of the motor.

Here, the torque transmission by means of frictional transmission at the prior stage is smaller than the torque transmission by means of gear meshing at the subsequent stage in the securable amount of torque to be transmitted. This makes little problem because the transmission torque at the prior-stage reduction is not so high in the first place, and the simple planetary roller mechanism, as will be described later, can be adjusted in the necessary transmission torques at the individual rollers by selecting the input and output members.

With the simple planetary roller mechanism in particular, the planetary rollers can be supported by a carrier that is separated from the speed-reducer side. Thus, even if vibration or deformation occurs on the speed-reducer side, the effect will hardly reach the roller contact surfaces of the simple planetary roller mechanism at all. Consequently, sure stable torque transmission is performed with yet fewer occurrences of problems.

Additionally, the incorporation of the simple planetary roller mechanisms, which exert such various functions as described above, into the covers around the output shafts of the motors to constitute the medium-speed motor groups substantially means that it is possible to provide a series of motors having a wide variation of rotation speeds.

The invention of claim 2 is that of claim 1, wherein the plurality of simple planetary roller mechanisms have ring rollers of the same diameter and planetary rollers and sun rollers of different diameter ratios to provide different speed-change ratios. Thereby, the foregoing problems have been solved.

When the ring rollers lying on the outermost side are thus set at the same diameter and the diameter ratios between the planetary rollers and the sun rollers are exclusively changed to realize a plurality of different speed-change ratios, it is possible to provide a series of motors with speed reducers having a number of reduction ratios without a significant change to the connecting dimensions to the speed reducers and motors.

The invention of claim 3 is that of claim 1 or 2, wherein the plurality of simple planetary roller mechanisms have the same connecting dimensions to the motors and have different frame numbers. Thereby, the foregoing problems have been solved.

When the simple planetary roller mechanisms are available with the same connecting dimensions to the motors and with a plurality of frame numbers, it is possible to widen the variation of medium-speed motors. Moreover, according to this configuration, the simple planetary roller mechanisms are coupled as if fully accommodated in the covers of the motors. This promotes the integration with the motors, allowing a further contribution to the configuration as "medium-speed motors."

The invention of claim 4 is any one of claims 1–3, wherein: the plurality of types of speed reducers combinable include an orthogonal axis gear speed reducer using a bevel gear; and the series includes motors with speed reducers for attaining total reduction ratios in the range of $1/3$ to $1/60$ by using the orthogonal axis gear speed reducer and the simple planetary roller mechanisms. Thereby, the foregoing problems have been solved.

Since the series includes the ones that attain total reduction ratios in the range of $1/3$ to $1/60$ by using the bevel-geared orthogonal axis gear speed reducer and the simple planetary roller mechanisms, it is possible to extend the range of selection for users while suppressing cost-up.

That is, orthogonal speed reducers of $1/3$ to $1/60$ in total reduction ratio typically belong to the domain of hypoid gear sets (at the greater reduction ratios in particular). According to the present invention, however, outputs already reduced by one stage in the range of $1/4$ to $1/6$ (yet wider, $1/2$ to $1/10$) are taken out as those of the "medium-speed motors." This allows the use of bevel gear sets, which are far less inexpensive, for the sake of a significant reduction in cost.

BRIEF DESCRIPTION OF THE DRAWINGS

FIG. 8 is a diagram showing an example where the selection group of motors in the series is extended;

FIG. 9 is a diagram showing the types of geared motors prepared as samples for a noise measurement test;

FIG. 10 is a diagram showing the results of the noise measurement test in a table;

FIG. 11 is a diagram graphing out the results of the noise measurement test;

FIG. 13 is a diagram showing noise spectra by type;

FIG. 15 is a diagram showing noise spectra by type;

BEST MODE FOR CARRYING OUT THE INVENTION

Hereinafter, an embodiment of the present invention will be described with reference to the drawings.

Figure 1:
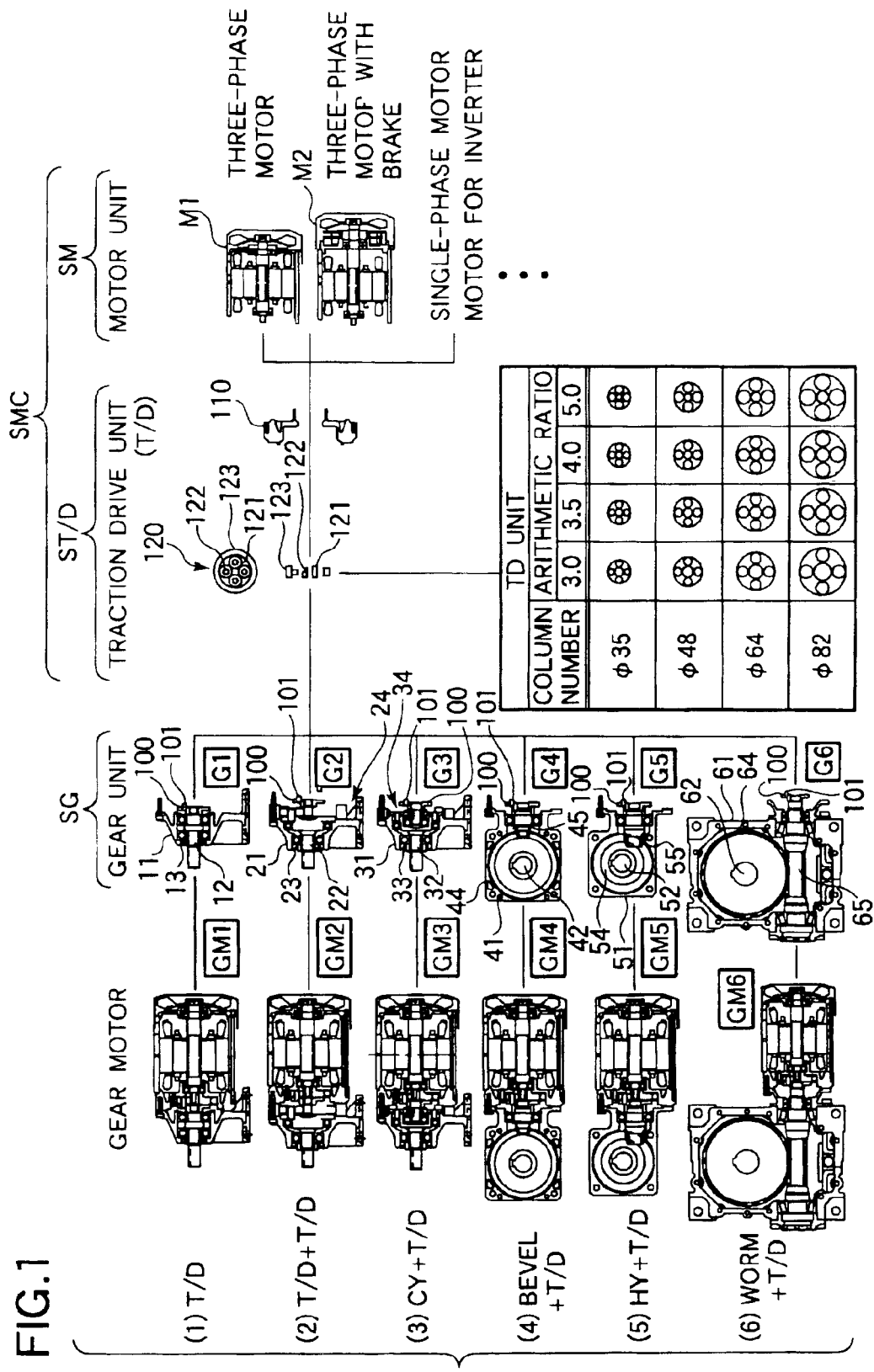
FIG. 1 is a configuration diagram of a series of motors with speed reducers shown as an embodiment of the present invention.

FIG. 1 shows the entire configuration of a series of motors with speed reducers (hereinafter, also referred to as driving apparatuses) of the embodiment. This series consists of a selection group SG of gear units (chiefly gear speed reducers), a selection group ST/D of traction drives (sometimes abbreviated as T/Ds) serving as simple planetary roller mechanisms, and a selection group SM of motor units (motors), which are intended to constitute arbitrary motors with speed reducers. Then, three units, or a single motor selected from the selection group SM of motor units, a single T/D unit (simple planetary roller unit) selected from the selection group ST/D of T/Ds, and a single speed reducer selected from the selection group SG of gear units, can be coupled to constitute an arbitrary motor with a speed reducer.

In this case, the selection group SG of gear units provides a plurality of types of output mechanism units as follows:

(1) An output mechanism unit G1 which has no reducing function in itself, and is combined with a motor and a T/D to make a driving apparatus GM1 for realizing a single-stage reduction by means of the T/D;

(2) A T/D type reduction output mechanism unit (speed reducer) G2 which has a T/D built in itself, and is combined with a motor and a T/D to make a driving apparatus GM2 for realizing a double-stage reduction by means of the T/Ds;

(3) An oscillating internal meshing planetary gear speed reducer G3 which has an oscillating internal meshing planetary gear structure arranged in itself, and is combined with a motor and a T/D to make a driving apparatus GM3 for realizing a first-stage reduction by means of the T/D+a second-stage reduction by means of the oscillating internal meshing planetary gear structure;

(4) A bevel type gear speed reducer G4 which has a bevel type gear structure arranged in itself, and is combined with a motor and a T/D to make a driving apparatus GM4 for realizing a first-stage reduction by means of the T/D+a second-stage reduction by means of the bevel type gear structure;

(5) A hypoid type gear speed reducer G5 which has a hypoid type gear structure arranged in itself, and is combined with a motor and a T/D to make a driving apparatus GM5 for realizing a first-stage reduction by means of the T/D+a second-stage reduction by means of the hypoid type gear structure; and (6) A worm type gear speed reducer G6 which has a worm type gear structure arranged in itself, and is combined with a motor and a T/D to make a driving apparatus GM6 for realizing a first-stage reduction by means of the T/D+a second-stage reduction by means of the worm type gear structure.

Figure 2:
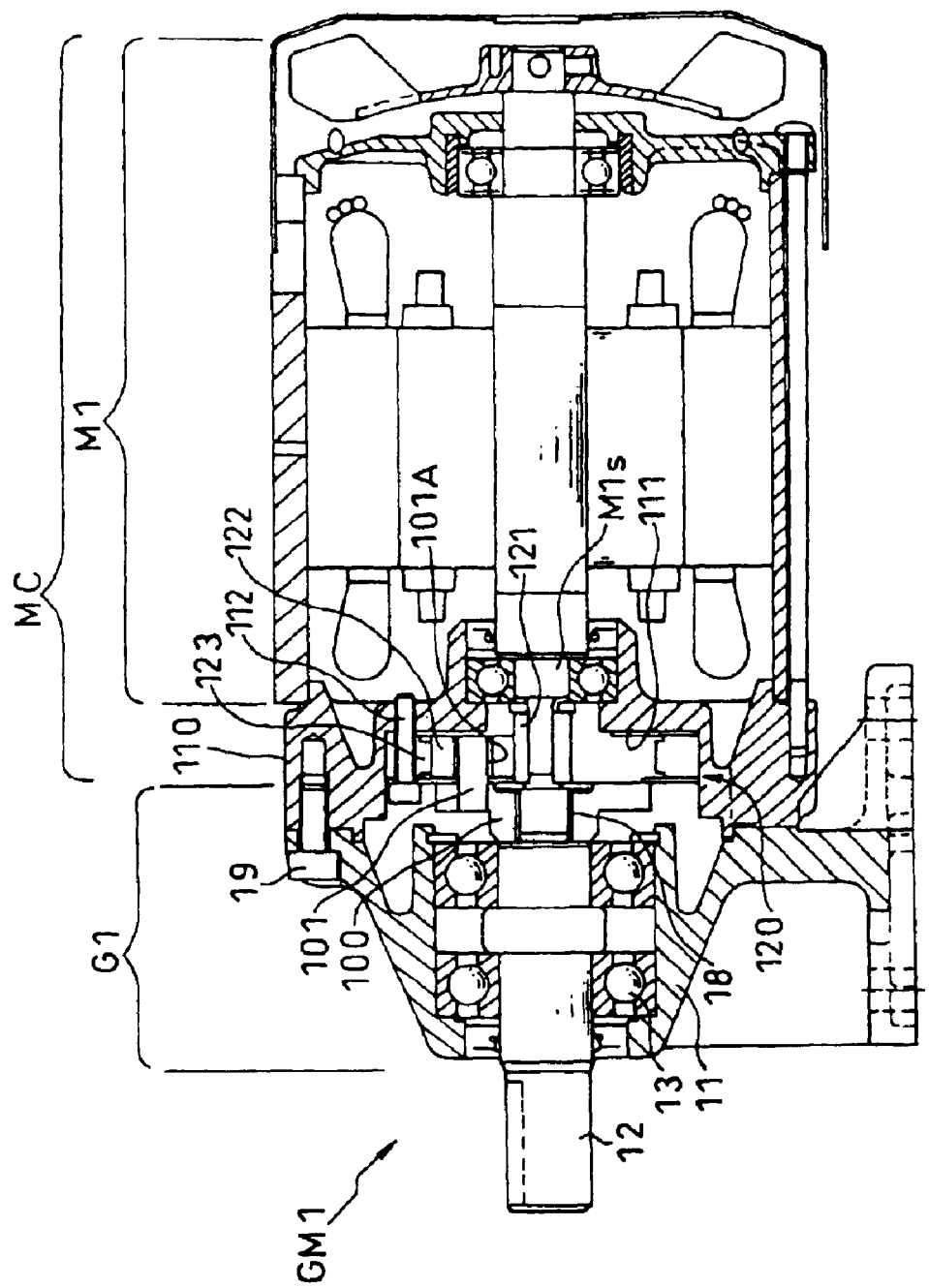
FIG. 2 is a sectional side view showing a first example of the driving apparatuses configurable in the series.

Here, the output mechanism unit G1 to make the driving apparatus GM1 for realizing a single-stage reduction by means of a T/D comprises, as shown enlarged in FIG. 2, a casing 11, an output shaft 12 which is rotatably mounted on the casing 11 through bearings 13, and a carrier 100 which has carrier pins 101 and is connected to the inner end of the output shaft 12.

Figure 3:
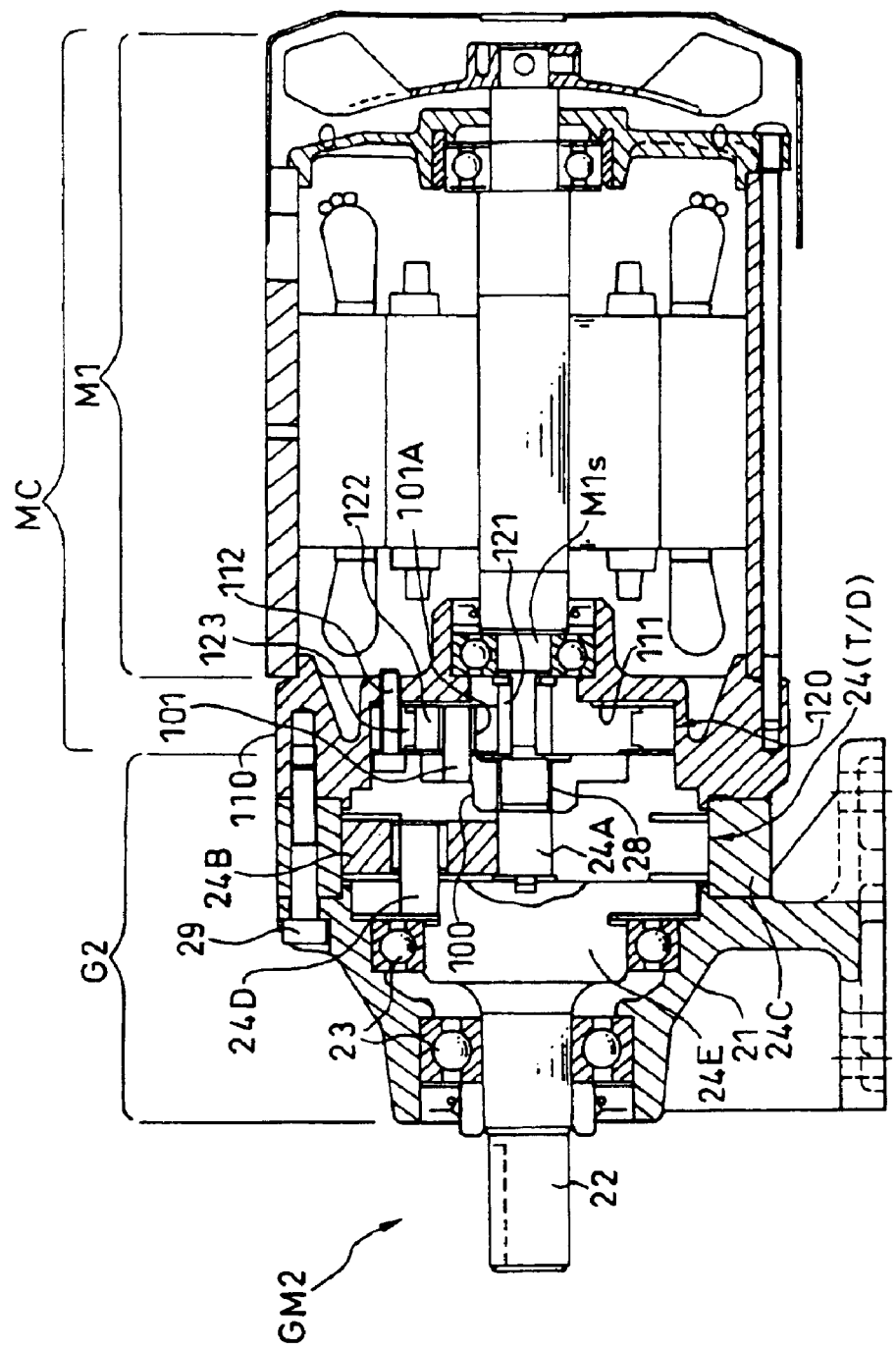
FIG. 3 is a sectional side view showing a second example of the driving apparatuses configurable in the series.

Moreover, the T/D type reduction output mechanism unit G2 to make the driving apparatus GM2 for realizing a double-stage reduction by means of T/Ds comprises, as shown enlarged in FIG. 3, a casing 21, an output shaft 22 which is rotatably mounted on the casing 21 through bearings 23, a T/D 24 which makes a rear-stage reduction unit having its output side connected to this output shaft 22, and a carrier 100 which has carrier pins 101 and is connected to the input side of this T/D 24.

Figure 4:
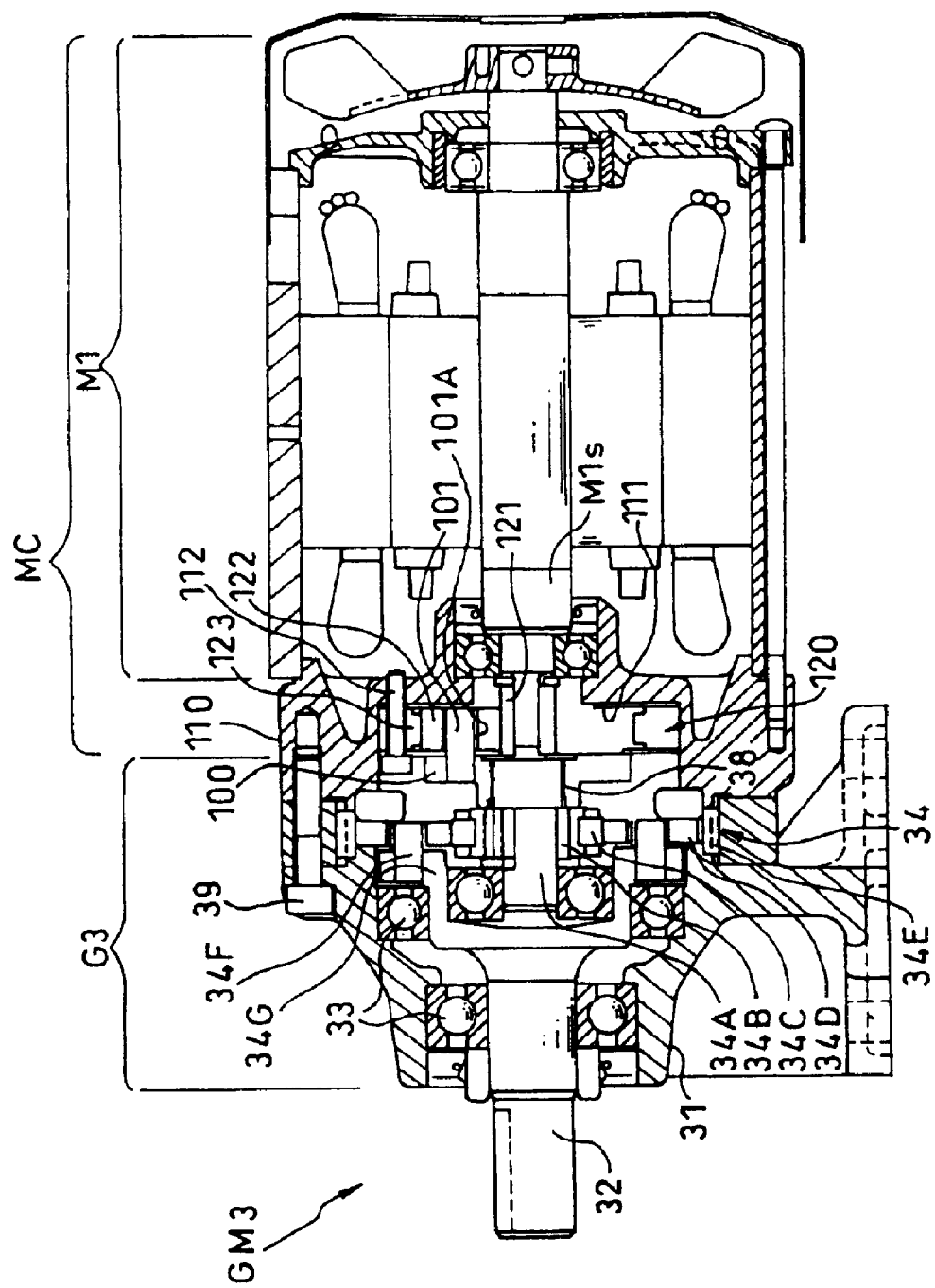
FIG. 4 is a sectional side view showing a third example of the driving apparatuses configurable in the series.

Moreover, the oscillating internal meshing planetary gear speed reducer G3 to make the driving apparatus GM3 for realizing a first-stage reduction by means of a T/D+a second-stage reduction by means of an oscillating internal meshing planetary gear structure comprises, as shown enlarged in FIG. 4, a casing 31, an output shaft 32 which is rotatably mounted on the casing 31 through bearings 33, an oscillating internal meshing gear structure 34 having its output side connected to this output shaft 32, and a carrier 100 which has carrier pins 101 and is connected to the input side of this oscillating internal meshing planetary gear structure 34.

Figure 5:
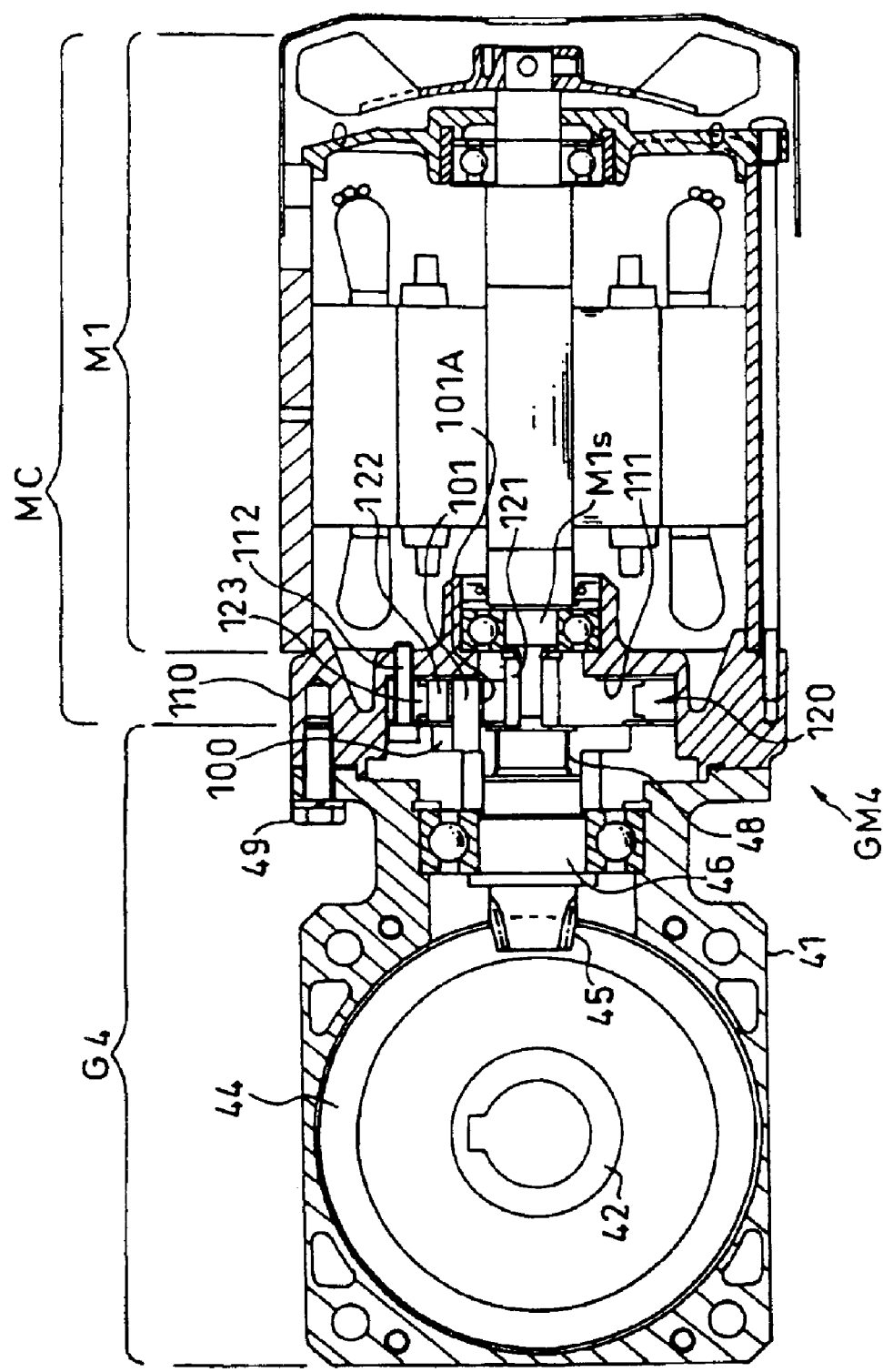
FIG. 5 is a sectional side view showing a fourth example of the driving apparatuses configurable in the series.

Moreover, the bevel type gear speed reducer G4 to make the driving apparatus GM4 for realizing a first-stage reduction by means of a T/D+a second-stage reduction by means of a bevel type gear structure comprises, as shown enlarged in FIG. 5, a casing 41, an output shaft 42 which is rotatably mounted on the casing 41 through bearings, a bevel gear 44 which is connected to this output shaft 42, a pinion 45 which meshes with this bevel gear 44, and a carrier 100 which has carrier pins 101 and is connected to this bevel pinion 45.

Figure 6:
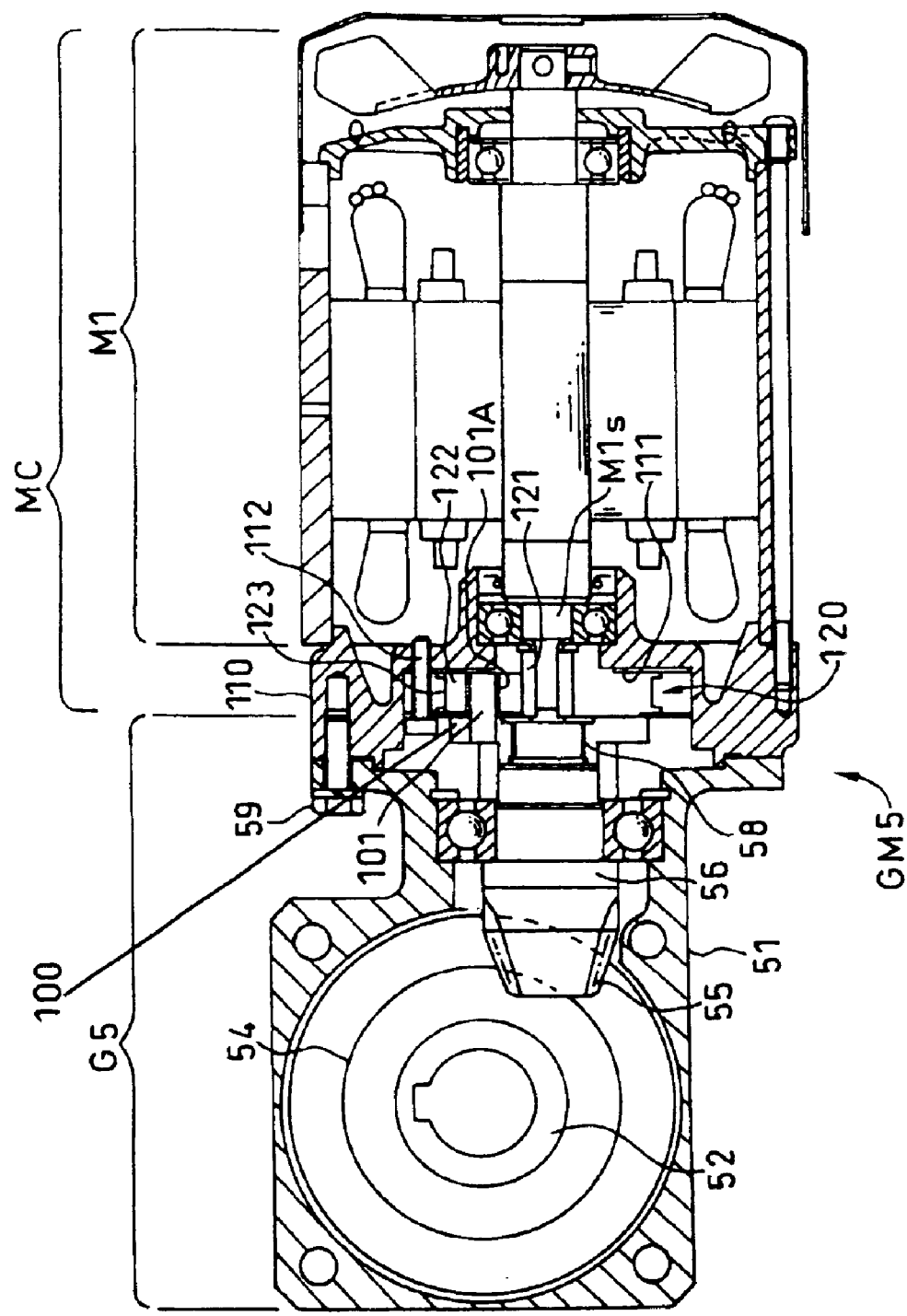
FIG. 6 is a sectional side view showing a fifth example of the driving apparatuses configurable in the series.

Moreover, the hypoid type gear speed reducer G5 to make the driving apparatus GM5 for realizing a first-stage reduction by means of a T/D+a second-stage reduction by means of a hypoid type gear structure comprises, as shown enlarged in FIG. 6, a casing 51, an output shaft 52 which is rotatably mounted on the casing 51 through bearings, a hypoid gear 54 which is connected to this output shaft 52, a hypoid pinion 55 which meshes with this hypoid gear 54, and a carrier 100 which has carrier pins 101 and is connected to this hypoid pinion 55.

Figure 7:
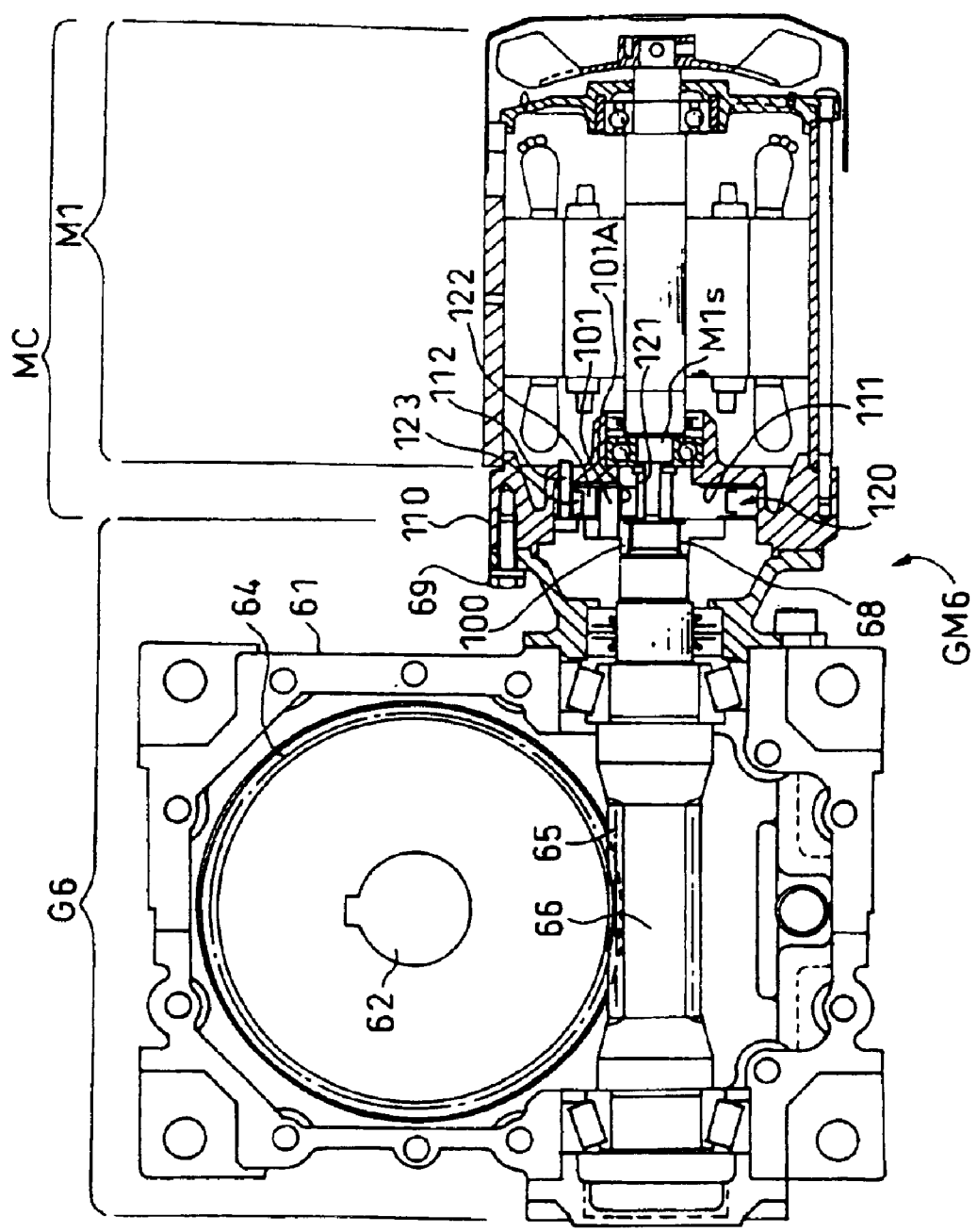
FIG. 7 is a sectional side view showing a sixth example of the driving apparatuses configurable in the series.
Figure 12A:
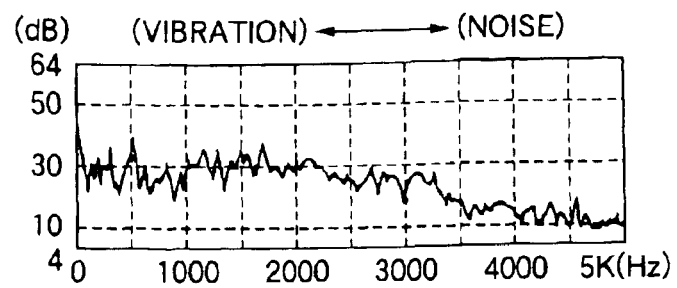
FIG. 12 is a diagram showing noise spectra by type.
Figure 12B:
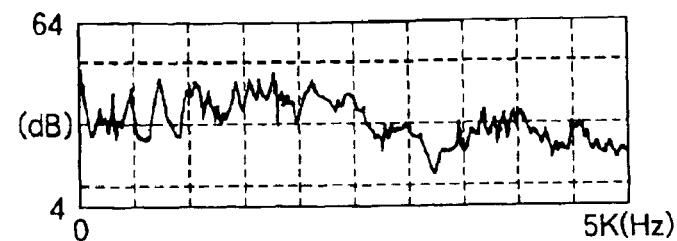
Figure 12C:
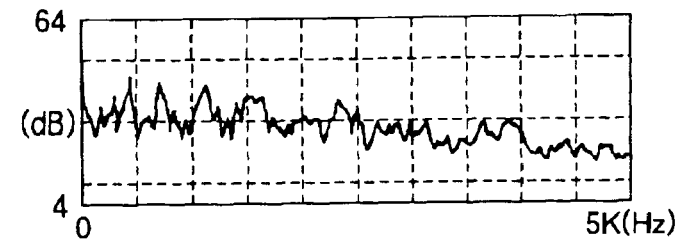
Figure 12D:
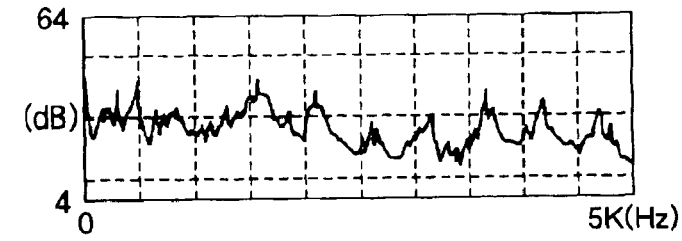
Figure 12E:
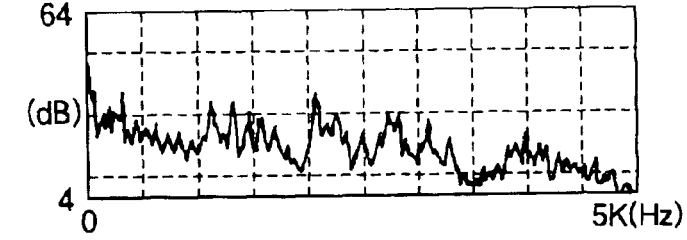
Figure 12F:
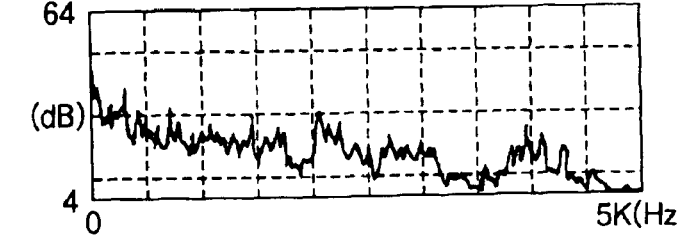
Figure 14A:
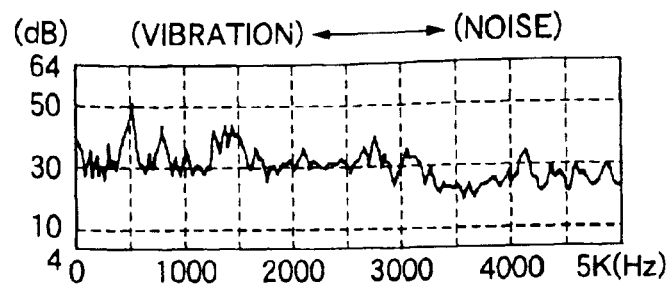
FIG. 14 is a diagram showing noise spectra by type.
Figure 14B:
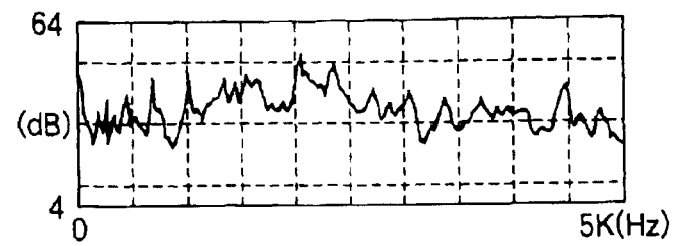
Figure 14C:
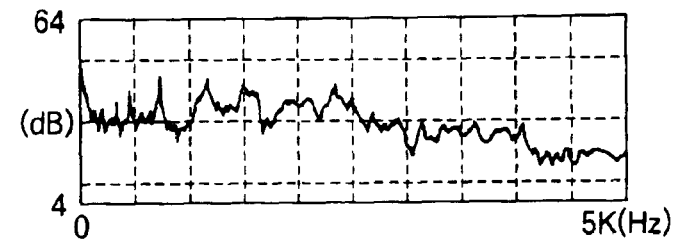
Figure 14D:
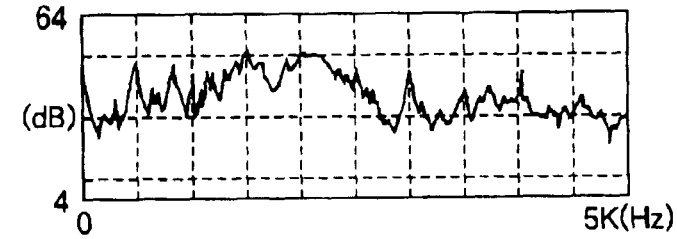
Figure 14E:
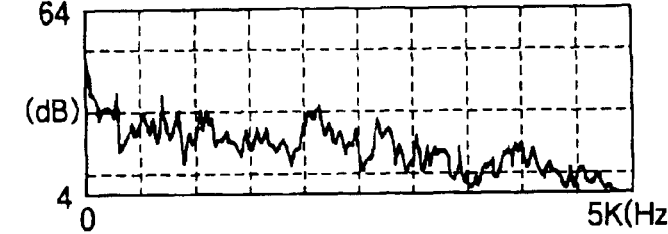
Figure 14F:
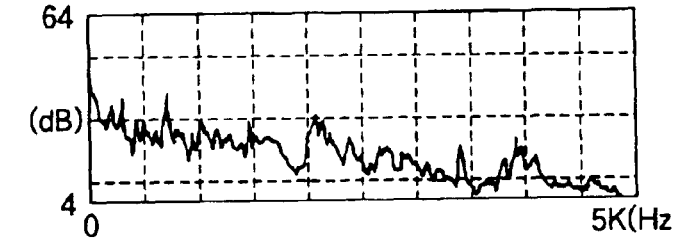
Figure 16:
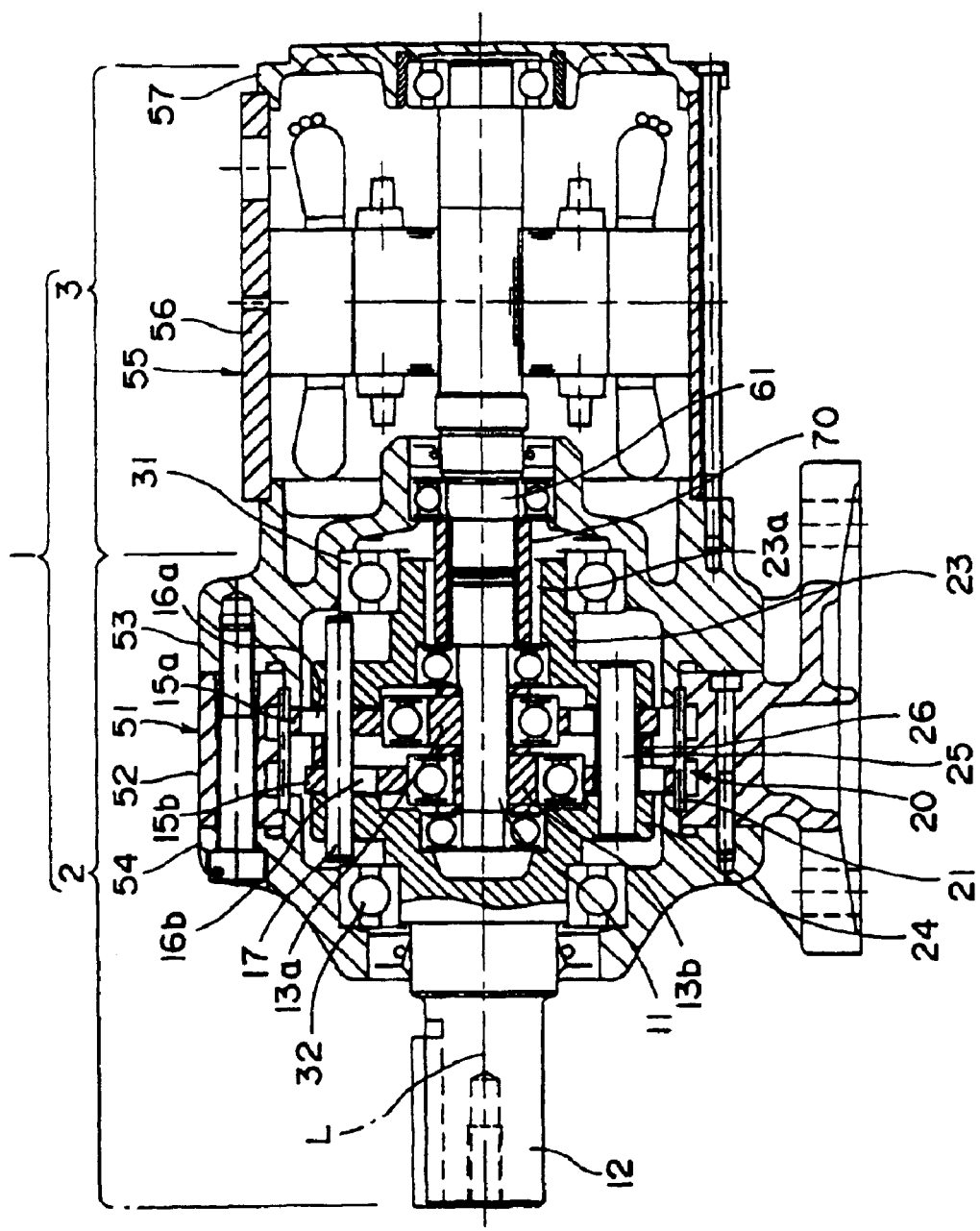
FIG. 16 is a sectional view of a conventional geared motor.

Moreover, the worm type gear speed reducer G6 to make the driving apparatus GM6 for realizing a first-stage reduction by means of a T/D+a second-stage reduction by means of a worm type gear structure comprises, as shown enlarged in FIG. 7, a casing 61, an output shaft 62 which is rotatably mounted on the casing 61 through bearings, a pinion gear 64 which is connected to this output shaft 62, a worm gear 65 which meshes with this pinion gear 64, and a carrier 100 which has carrier pins 101 and is connected to this worm gear 65.

As concerns the casings, the shown examples are ones of footed type (having a mounting surface parallel to the output shaft), whereas ones of flange type (having a mounting surface perpendicular to the output shaft) are also available according to need.

Moreover, the selection group ST/D of T/D (traction drive) units provides a plurality of combinations of rollers (combinations of a ring roller, planetary rollers, and a sun roller=simple planetary roller units=T/D units 120) having different speed-change ratios with respect to each of a plurality of frame numbers.

Moreover, the selection group SM of motor units provides a plurality of types of motors such as a three-phase motor, a three-phase motor with a brake, a single-phase motor, and a motor intended for an inverter. In some cases, as shown in FIG. 8, a large-sized motor group is prepared separately.

Moreover, the motors are accompanied with around-output-shaft covers 110A and 110B (the front casings of the motors). The combinations of rollers (combinations of a ring roller, planetary rollers, and a sun roller) for constituting the T/D units 120 are mounted onto these covers 110A and 110B (as if accommodated in the covers 110). This makes it possible to constitute motor-integrated T/D mechanisms. A plurality of T/D units can be mounted on the common covers 110 fixed to the motors to configure a medium-speed motor group SMC. That is, the aforementioned covers 110A and 110B are available in a single type for motors of each identical size (irrespective of types), and used in common for coupling a plurality of T/Ds.

The T/D mechanisms (simple planetary roller mechanisms) are composed chiefly of a sun roller 121, planetary rollers 122 which roll in contact around the sun roller 121, and a ring roller 123 with which the planetary rollers 122 make internal contact. These three types of rollers 121, 122, and 123 for making a simple planetary roller unit are mounted inside the covers 110 arranged in front of the motors to constitute the simple planetary roller mechanisms.

Here, any output mechanism unit (chiefly a speed reducer) out of the plurality of types of gear units prepared on the output side can be selected and connected to the simple planetary roller mechanisms that have the simple planetary roller units of same size, through the carrier 100 for taking out the revolution component of the planetary rollers 122.

Moreover, the T/D units 120 are available in a plurality of types in which the ring rollers 123 have the same diameter while the diameter ratios between the planetary rollers 122 and the sun rollers 121 are changed to provide different speed-change ratios. This allows a wider range of choice for users (development based on the horizontal axis of the T/D table in FIG. 1).

Moreover, the T/D units 120 are available in a plurality of different frame numbers. Besides, the T/D units 120 and the plurality of types of motors prepared are designed to have the same connecting dimensions, and the T/D units 120 and the plurality of types of gear units prepared are designed to have the same connecting dimensions as well. Consequently, a series of driving apparatuses having motor units and gear units (of different frame numbers) is developed with the T/D units 120 of respective frame numbers at the center. This allows a still wider range of choice for users (development based on the vertical axis of the T/D table in FIG. 1).

The provision of the T/D units in such a matrix fashion can further widen the range of choice of the entire series.

Next, examples of the driving apparatuses (motors with speed reducers) configurable in this series will be described in further detail with reference to FIGS. 2–7.

FIG. 2 is a configuration diagram of the driving apparatus GM1 which realizes a single-stage reduction by means of a T/D.

This driving apparatus GM1 is an integrated combination of a motor M1 selected from the selection group SM of motor units, a cover 110 around the output shaft of the motor, a T/D unit 120 selected from the selection group ST/D of T/D units and mounted inside the cover 110, and the output mechanism unit G1 to be connected to the motor M1 through the cover 110.

To make this driving apparatus GM1, the cover 110 is fixed to the front end of the motor M1. A ring roller 123, an element of the T/D unit, is fixed to the inner periphery of a recess 111 in the front face of the cover 110 with a bolt 112. In addition, three to four planetary rollers 122 are arranged on the inner periphery of the ring roller 123, and a sun roller 121 is arranged within the planetary rollers 122. This sun roller 121 is connected to the extremity of a motor output shaft M1s.

At this stage, a medium-speed motor MC is constituted.

More specifically, the high-speed rotation of the motor output shaft M1s can be reduced in speed by the T/D unit 120 for output. Thus, when coupled to the gear unit through the carrier 100 for taking out the revolution of the planetary rollers 122, it can be handled as a substantial medium-speed motor MC1. Here, as mentioned before, a plurality of reduction ratios are prepared for the T/D unit 120 so as to allow free selection. Consequently, medium-speed motors MC of different reduction ratios are available in series.

As above, after the T/D unit 120 is mounted inside the cover 110 at the front end of the motor M1, the carrier pins 101 arranged on the carrier 100 of the output mechanism unit G1 are fitted to the respective planetary rollers 122 via inner rollers (cylindrical slide promoting members for the carrier pins 101 to be covered with, being interposed between the carrier pins 101 and the planetary rollers 122) 101A. At the same time, the casing 11 is coupled by a bolt 19 to the cover 110 which is connected to the front end of the motor M1. Thereby the driving apparatus GM1 is assembled.

In this driving apparatus GM1, the high-speed rotation of the motor M1 is reduced to medium-speed rotation by the T/D unit 120 and taken out as-is from the output shaft 12.

More specifically, when the main shaft M1s of the motor M1 rotates, the rotation is transmitted to the sun roller 121 of the T/D unit 120 so that the planetary rollers 122 are going to rotate. Here, the planetary rollers 122 are in contact with the fixed ring roller 123, and therefore make rotation and revolution along the inner periphery of the ring roller 123. The revolution component thereof is taken out from the output shaft 12 of the output mechanism unit G1 through the carrier 100.

The driving apparatus GM1 in this case uses no gear speed reducer. It is therefore possible to achieve low noise and low vibration which are features of T/Ds. In addition, the reduction ratio can be changed widely depending on the selection of the T/D unit 120.

Incidentally, the carrier 100 is connected to the inner end of the output shaft 12 of the output mechanism unit G1 via a spline 18, and can thus be replaced as needed according to the magnitude of the radius of revolution of the planetary rollers 122 and the like.

Next, FIG. 3 is a configuration diagram of the driving apparatus GM2 which realizes a double-stage reduction by means of T/Ds.

This driving apparatus GM2 is an integrated combination of the motor M1 selected from the selection group SM of motor units, a cover 110 around the output shaft of the motor, a T/D unit 120 selected from the selection group ST/D of T/D units and mounted inside the cover 110, and the T/D type reduction output mechanism unit G2 to be connected to the motor M1 through the cover 110.

Here, the configuration is identical as far as the medium-speed motor MC described before. Since a difference consists in that the T/D type reduction output mechanism unit G2 is combined to the output side, description will be given of the difference alone.

The T/D 24 in the T/D type reduction output mechanism unit G2 comprises a sun roller 24A, planetary rollers 24B which make rolling contact with the outer periphery of the same, a ring roller 24C for the planetary rollers 24B to make rolling contact with its inner periphery, and a carrier 24E which has carrier pins 24D and takes out the revolution component of the planetary rollers 24B. This carrier 24E is integrally formed on the rear end of the output shaft 22. The carrier 100 for taking out the revolution component of the planetary rollers 122 of the T/D unit 120 at the prior stage is connected to the sun roller 24A via a spline 28.

To make this driving apparatus GM2, the foregoing medium-speed motor MC is initially constituted before the carrier pins 101 arranged on the carrier 100 of the T/D type reduction output mechanism unit G2 are fitted to the respective planetary rollers 122 via the inner rollers 101A. At the same time, the casing 21 is coupled by a bolt 29, along with the ring roller 24C, to the cover 110 which is connected to the front end of the motor M1. Thereby the driving apparatus GM2 is assembled.

In this driving apparatus GM2, the high-speed rotation of the motor M1 is reduced by the T/D unit 120, or a first reduction unit, to medium-speed rotation, which is then input to the T/D type reduction output mechanism unit G2 for a further reduction by the T/D 24 in the output mechanism unit G2 before taken out from the output shaft 22.

More specifically, when the output shaft M1s of the motor M1 rotates, the rotation reduced to medium speed by the T/D unit 120 is input to the sun roller 24A which is the input member of the T/D type reduction output mechanism unit G2. Then, due to the rotation of the sun roller 24A, the planetary rollers 24B are going to rotate. Here, the planetary rollers 24B are in contact with the fixed ring roller 24C, and therefore make rotation and revolution along the inner periphery of the ring roller 24C. The revolution component thereof is taken out from the output shaft 22 through the carrier 24E.

As in the foregoing example, the driving apparatus GM2 in this case uses no gear speed reducer. It is therefore possible to achieve low noise and low vibration which are features of T/Ds. Besides, the reduction ratio can be changed widely depending on the selection of the T/D unit 120 at the first stage and the selection of the T/D 24 at the second stage.

Next, FIG. 4 is a configuration diagram of the driving apparatus GM3 which realizes a first-stage reduction by means of a T/D+a second-stage reduction by means of an oscillating internal meshing planetary gear structure.

This driving apparatus GM3 is an integrated combination of the motor M1 selected from the selection group SM of motor units, a cover 110 around the output shaft of the motor, a T/D unit 120 selected from the selection group ST/D of T/D units and mounted inside the cover 110, and the oscillating internal meshing planetary gear speed reducer G3 to be connected to the motor M1 through the cover 110.

Here, the configuration is identical as far as the medium-speed motor MC described before. Since a difference consists in that the oscillating internal meshing planetary gear speed reducer G3 is combined to the output side, description will be given of the difference alone.

The oscillating internal meshing planetary gear structure 34 in the oscillating internal meshing planetary gear speed reducer G3 comprises an input shaft 34A, an eccentric body 34B which is arranged on the outer periphery of the input shaft 34A, an external gear 34D which is fitted to the outer periphery of the eccentric body 34B via a bearing 34C, an internal gear 34E with which the external gear 34D meshes internally, and a carrier 34G which has carrier pins 34F and takes out only a rotation component of the external gear 34D. This carrier 34G is integrally formed on the rear end of the output shaft 32. The carrier 100 for taking out the revolution component of the planetary rollers 122 of the T/D unit 120 at the prior stage is connected to the input shaft 34A via a spline 38.

To make this driving apparatus GM2, the foregoing medium-speed motor MC is initially constituted before the carrier pins 101 arranged on the carrier 100 of the oscillating internal meshing planetary gear speed reducer G3 are fitted to the respective planetary rollers 122 via the inner rollers 101A. At the same time, the casing 31 is coupled by a bolt 39, along with the internal gear 34E, to the cover 110 which is connected to the front end of the motor M1. Thereby the driving apparatus GM3 is assembled.

In this driving apparatus GM3, the high-speed rotation of the motor M1 is reduced by the T/D unit 120, the first reduction unit, to medium-speed rotation, which is then input to the oscillating internal meshing planetary gear speed reducer G3 for a further large reduction by the oscillating internal meshing planetary gear structure 34 in the oscillating internal meshing planetary gear speed reducer G3 before taken out from the output shaft 32.

More specifically, when the main shaft M1s of the motor M1 rotates, the rotation is reduced to medium speed by the T/D unit 120 and then input to the external gear 34D which is the input member of the oscillating internal meshing planetary gear speed reducer G3. Since the external gear 34D is in mesh with the internal gear 34E, the input rotational power is taken out as the rotation component of the external gear 34E and transmitted to the output shaft 32.

The driving apparatus GM3 in this case has the structure that the oscillating internal meshing planetary gear speed reducer G3, connected as the output mechanism unit, tends to produce vibration and noise by itself due to the eccentric rotation of the external gear 34D. As stated before, however, the presence of the T/D unit 120 contributes a significant overall reduction in noise and vibration far beyond expectation.

Next, FIG. 5 is a configuration diagram of the driving apparatus GM4 which realizes a first-stage reduction by means of a T/D+a second-stage reduction by means of a bevel type gear structure.

This driving apparatus GM4 is an integrated combination of the motor M1 selected from the selection group SM of motor units, a cover 110 around the output shaft of the motor, a T/D unit 120 selected from the selection group ST/D of T/D units and mounted inside the cover 110, and the bevel type gear speed reducer G4 to be connected to the motor M1 through the cover 110.

Here, the configuration is identical as far as the medium-speed motor MC described before. Since a difference lies in that the bevel type gear speed reducer G4 is combined to the output side, description will be given of the difference alone.

An input shaft 46 and the output shaft 42 both are rotatably mounted on the casing 41 of the bevel type gear speed reducer G4 so as to be orthogonal to each other. The bevel pinion 45 is formed on one end of the input shaft 46. The carrier 100 for taking out the revolution component of the planetary rollers 122 of the T/D unit 120 is connected to the other end of the input shaft 45 via a spline 48. In addition, the bevel gear 44 for meshing with the bevel pinion 45 is fixed to the output shaft 42.

To make this driving apparatus GM4, the foregoing medium-speed motor MC is initially constituted before the carrier pins 101 arranged on the carrier 100 of the bevel type gear speed reducer G4 are fitted to the respective planetary rollers 122 via the inner rollers 101A. At the same time, the casing 41 is coupled by a bolt 49 to the cover 110 which is connected to the front end of the motor M1. Thereby the driving apparatus GM4 is assembled.

In this driving apparatus GM5, the high-speed rotation of the motor M1 is reduced by the T/D unit 120, the first reduction unit, to medium-speed rotation, which is then input to the bevel type gear speed reducer G4 for a further large reduction by the meshing between the bevel pinion 45 and the bevel gear 44 in the bevel type gear speed reducer G4 before taken out from the output shaft 42.

The driving apparatus GM4 in this case has the structure that the bevel type gear speed reducer G4, connected as the output mechanism unit, tends to produce vibration and noise by itself. The presence of the T/D unit 120, however, contributes an overall reduction in noise and vibration.

Incidentally, the series using the bevel type gear speed reducer G4 includes ones that achieve total reduction ratios in the range of ⅓ to ¹⁄₆₀ as combined with the T/D unit 120 at the prior stage. Of this range, higher domains in particular have been difficult to attain without a hypoid type gear structure heretofore. Nevertheless, the present invention allows substitution of the bevel type with significant cost cutting. Incidentally, bevel type gear structures are generally higher in noise than hypoid types. In the present invention, however, there will occur no particular problem even in terms of noise since the "medium-speed motors" are realized by using the simple planetary rollers.

Next, FIG. 6 is a configuration diagram of the driving apparatus GM5 which realizes a first-stage reduction by means of a T/D+a second-stage reduction by means of a hypoid type gear structure.

This driving apparatus GM5 is an integrated combination of the motor M1 selected from the selection group SM of motor units, a cover 110 around the output shaft of the motor, a T/D unit 120 selected from the selection group ST/D of T/D units and mounted inside the cover 110, and the hypoid type gear speed reducer G5 to be connected to the motor M1 through the cover 110.

Here, the configuration is identical as far as the medium-speed motor MC described before. Since a difference lies in that the hypoid type gear speed reducer G5 is combined to the output side, description will be given of the difference alone.

An input shaft 56 and the output shaft 52 both are rotatably mounted on the casing 51 of the hypoid type gear speed reducer G5 so as to be orthogonal to each other. In this case, the input shaft 56 is placed on an axis offset by a predetermined distance from a line that passes through the center of the output shaft 52 and is orthogonal to the output shaft 52. The hypoid pinion 55 is formed on one end of the input shaft 56. The carrier 100 for taking out the revolution component of the planetary rollers 122 of the T/D unit 120 is connected to the other end of the input shaft 56 via a spline 58. In addition, the hypoid gear 54 for meshing with the hypoid pinion 55 is fixed to the output shaft 52.

To make this driving apparatus GM5, the foregoing medium-speed motor MC is initially constituted before the carrier pins 101 arranged on the carrier 100 of the hypoid type gear speed reducer G5 are fitted to the respective planetary rollers 122 via the inner rollers 101A. At the same time, the casing 51 is coupled by a bolt 59 to the cover 110 which is connected to the front end of the motor M1. Thereby the driving apparatus GM5 is assembled.

In this driving apparatus GM4, the high-speed rotation of the motor M1 is reduced by the T/D unit 120, the first reduction unit, to medium-speed rotation, which is then input to the hypoid type gear speed reducer G5 for a further large reduction by the meshing between the hypoid pinion 55 and the hypoid gear 54 in the hypoid type gear speed reducer G5 before taken out from the output shaft 52.

The driving apparatus GM5 in this case has the structure that the hypoid type gear speed reducer G5, connected as the output mechanism unit, does not produce much vibration or noise by itself. The presence of the T/D unit 120 realizes a driving apparatus with an additional overall reduction in noise and vibration.

Next, FIG. 7 is a configuration diagram of the driving apparatus GM6 which realizes a first-stage reduction by means of a T/D+a second-stage reduction by means of a worm type gear structure.

This driving apparatus GM6 is an integrated combination of the motor M1 selected from the selection group SM of motor units, a cover 110 around the output shaft of the motor, a T/D unit 120 selected from the selection group ST/D of T/D units and mounted inside the cover 110, and the worm type gear speed reducer G6 to be connected to the motor M1 through the cover 110.

Here, the configuration is identical as far as the medium-speed motor MC described before. Since a difference lies in that the worm type gear speed reducer G6 is combined to the output side, description will be given of the difference alone.

The output shaft 62 is rotatably mounted on the casing 61 of the worm type gear speed reducer G6. The worm gear 64 is fixed to this output shaft 62. Besides, an input shaft 66 having the worm pinion 65 is rotatably arranged so as to mesh with the worm gear 64. The carrier 100 for taking out the revolution component of the planetary rollers 122 of the T/D unit 120 is connected to one end of the input shaft 66 via a spline 68.

To make this driving apparatus GM6, the foregoing medium-speed motor MC is initially constituted before the carrier pins 101 arranged on the carrier 100 of the worm type gear speed reducer G6 are fitted to the respective planetary rollers 122 via the inner rollers 101A. At the same time, the casing 61 is coupled by a bolt 69 to the cover 110 which is connected to the front end of the motor M1. Thereby the driving apparatus GM6 is assembled.

In this driving apparatus GM6, the high-speed rotation of the motor M1 is reduced by the T/D unit 120, the first reduction unit, to medium-speed rotation, which is then input to the worm type gear speed reducer G6 for a further large reduction by the meshing between the worm pinion 65 and the worm gear 64 in the worm type gear speed reducer G6 before taken out from the output shaft 62.

The driving apparatus GM6 in this case has the structure that the worm type gear speed reducer G6, connected as the output mechanism unit, does not produce much vibration or noise by itself, either. The presence of the T/D unit 120 achieves an additional overall reduction in noise and vibration.

[Noise Measurement Test]

Next, the results of a noise measurement test performed on driving apparatuses of the foregoing embodiment of the present invention will be described as the data that objectively indicates the effectiveness of the present invention.

Here, as the samples of the driving apparatuses of the present invention, driving apparatuses GM3 incorporating the oscillating internal meshing planetary gear speed reducer G3, considered to be the highest in noise level, were subjected to the test. For the sake of comparison, the same measurement test was also performed on several other geared motors.

The geared motors used in the measurement test are of six types, each having a motor and two stages of reduction units. That is, the six types of reduction units including comparative examples are coupled to the motors as the first-stage reduction units. For the second-stage reduction units, an oscillating internal meshing planetary gear structure is coupled to each.

The geared motors prepared as the respective samples (a) to (f) have the following configurations. FIG. 9 shows the combinations of the mechanism components in the respective types of geared motors, employing simples for the sake of brevity.

The symbols employed here represent:

M . . . motor,
C . . . oscillating internal meshing planetary gear type,
F . . . power-distributed shaft type, P . . . simple planetary type,
G . . . gear type, and
T/D . . . roller-based frictional transmission type.
Specifically:
C1 . . . reduction stage of oscillating internal meshing planetary gear type (subsequent-stage side=second stage),
C2 . . . reduction stage of oscillating internal meshing planetary gear type (prior-stage side=first stage),
F(G) . . . gear type reduction stage of power-distributed shaft type,
F(T/D) . . . frictional transmission roller type reduction stage of power-distributed shaft type,
P(G) . . . gear type reduction stage of planetary type,
P(T/D) . . . frictional transmission roller type reduction stage of planetary type,
A . . . planetary rollers of retention type (1), and
B . . . planetary rollers of retention type (2).

[Types of Geared Motors Used in Test]

The geared motors of the respective types of samples (a) to (f) are expressed in symbols as follows:
(a) sample . . . "C1+C2+M,"
(b) sample . . . "C1+F(G)+M,"
(c) sample . . . "C1+F(T/D)+M,"
(d) sample . . . "C1+P(G)+M,"
(e) sample . . . "C1+P(T/D)A+M," and
(f) sample . . . "C1+P(T/D)B+M."

Of these samples, (a) to (d) are the geared motors prepared as the comparative examples, and (e) and (f) are the geared motors according to the embodiment of the present invention.

Figure 19:
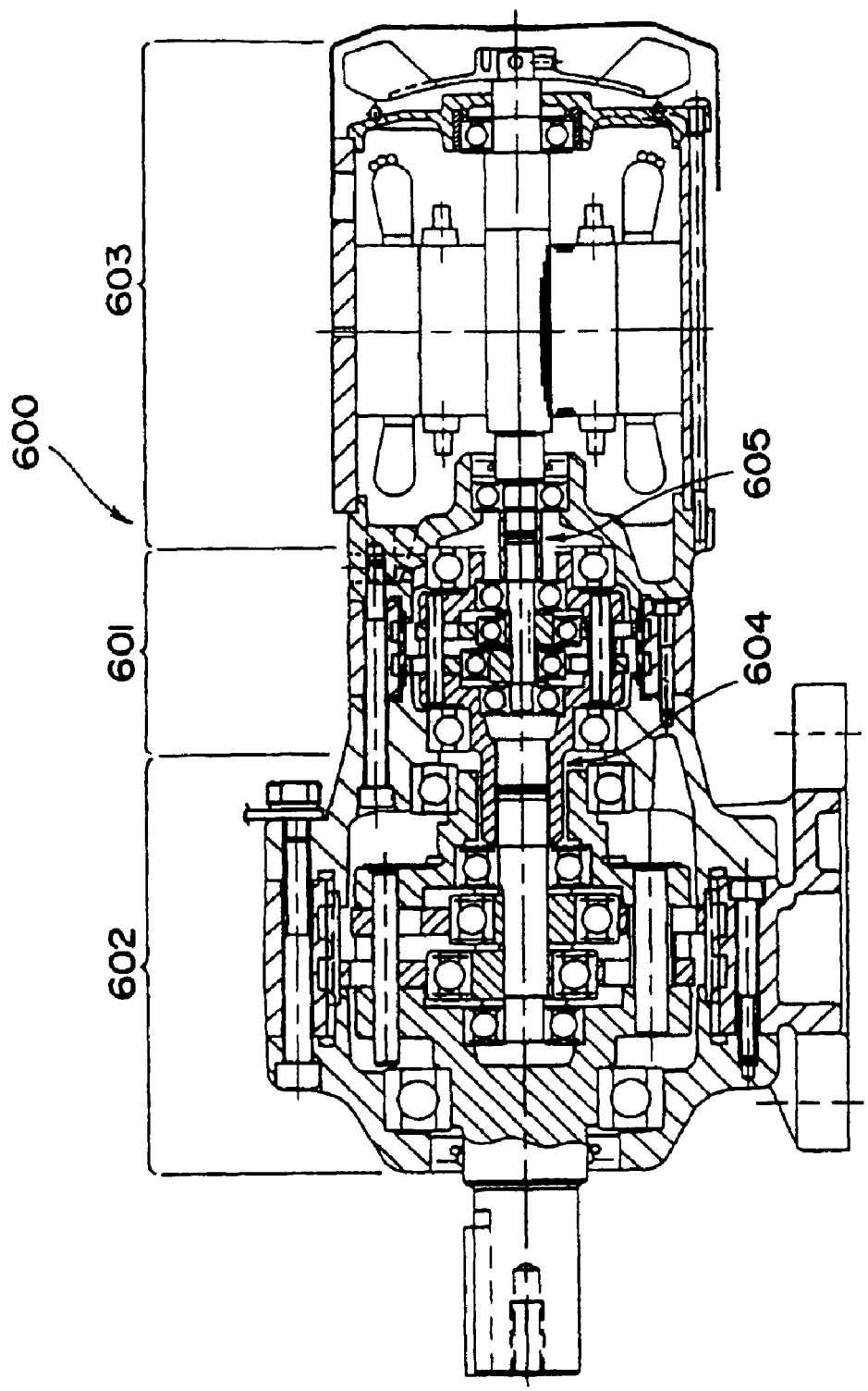
FIG. 19 is a sectional view of a geared motor used as a comparative example in the noise measurement test.

The geared motor of the (a) sample "C1+C2+M" is the type of geared motor 600 shown in FIG. 19. This geared motor 600 has an oscillating internal meshing planetary gear mechanism 601 (C2) as the first-stage reduction unit and an oscillating internal meshing planetary gear mechanism 602 (C1) as the second-stage reduction unit. Then, the shaft of a motor (M) 603 is floating-connected to the input shaft of the oscillating internal meshing planetary gear mechanism 601 at the first stage via a spline 605. The output shaft of the oscillating internal meshing planetary gear mechanism 601 at the first stage is floating-connected to the input shaft of the oscillating internal meshing planetary gear mechanism 602 at the second stage via a spline 604.

Figure 17:
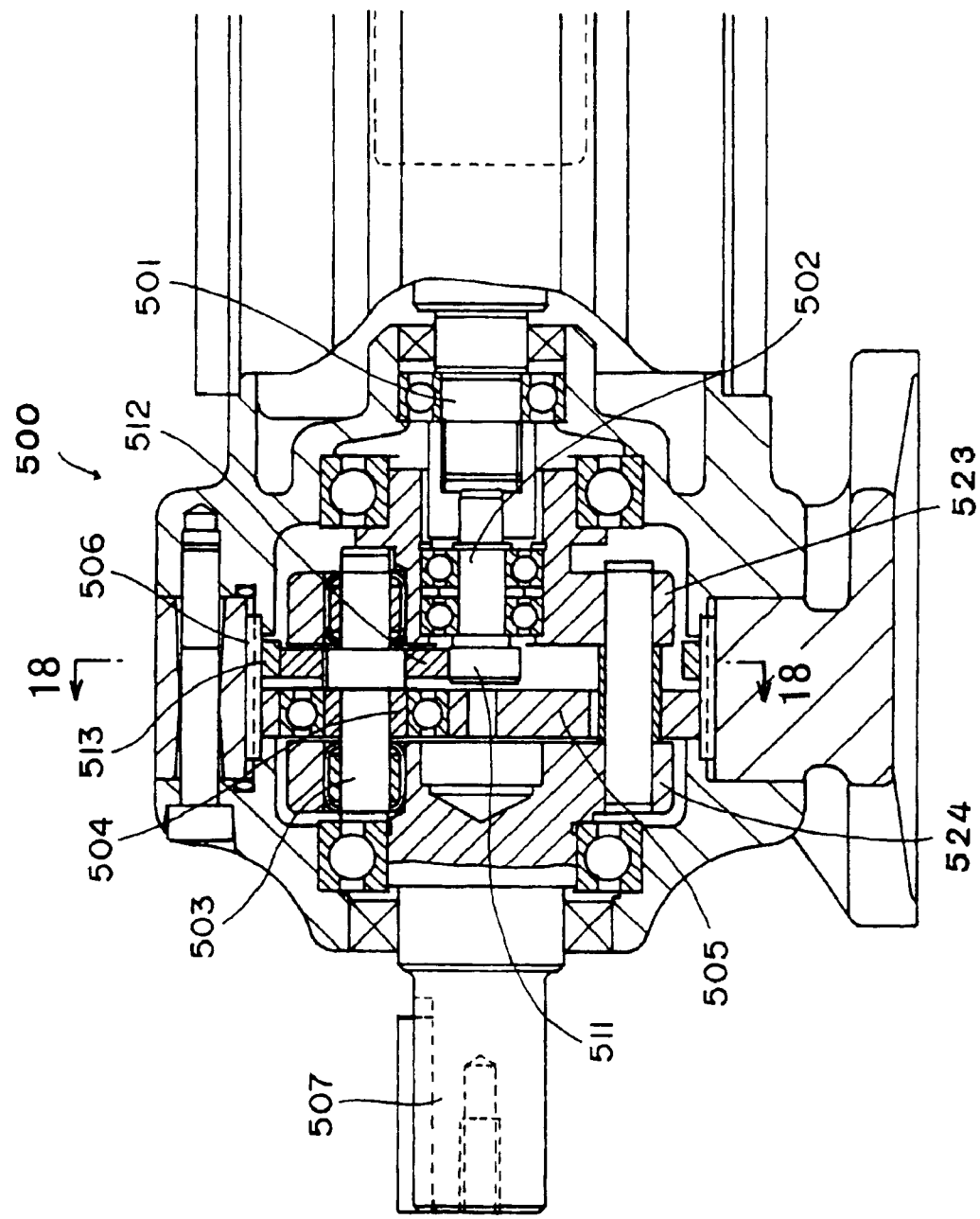
FIG. 17 is a sectional view of a conventional oscillating internal meshing planetary gear structure of power-distributed shaft type.
Figure 18:
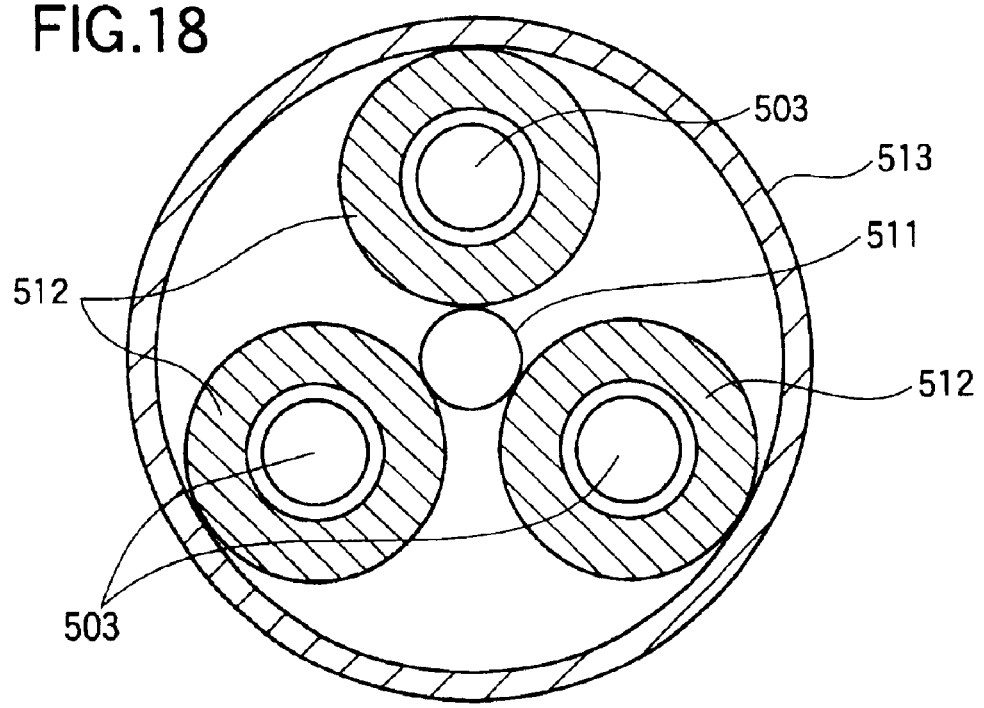
FIG. 18 is a schematic sectional view of the arrowed portion XIX—XIX of FIG. 17.
Figure 20:
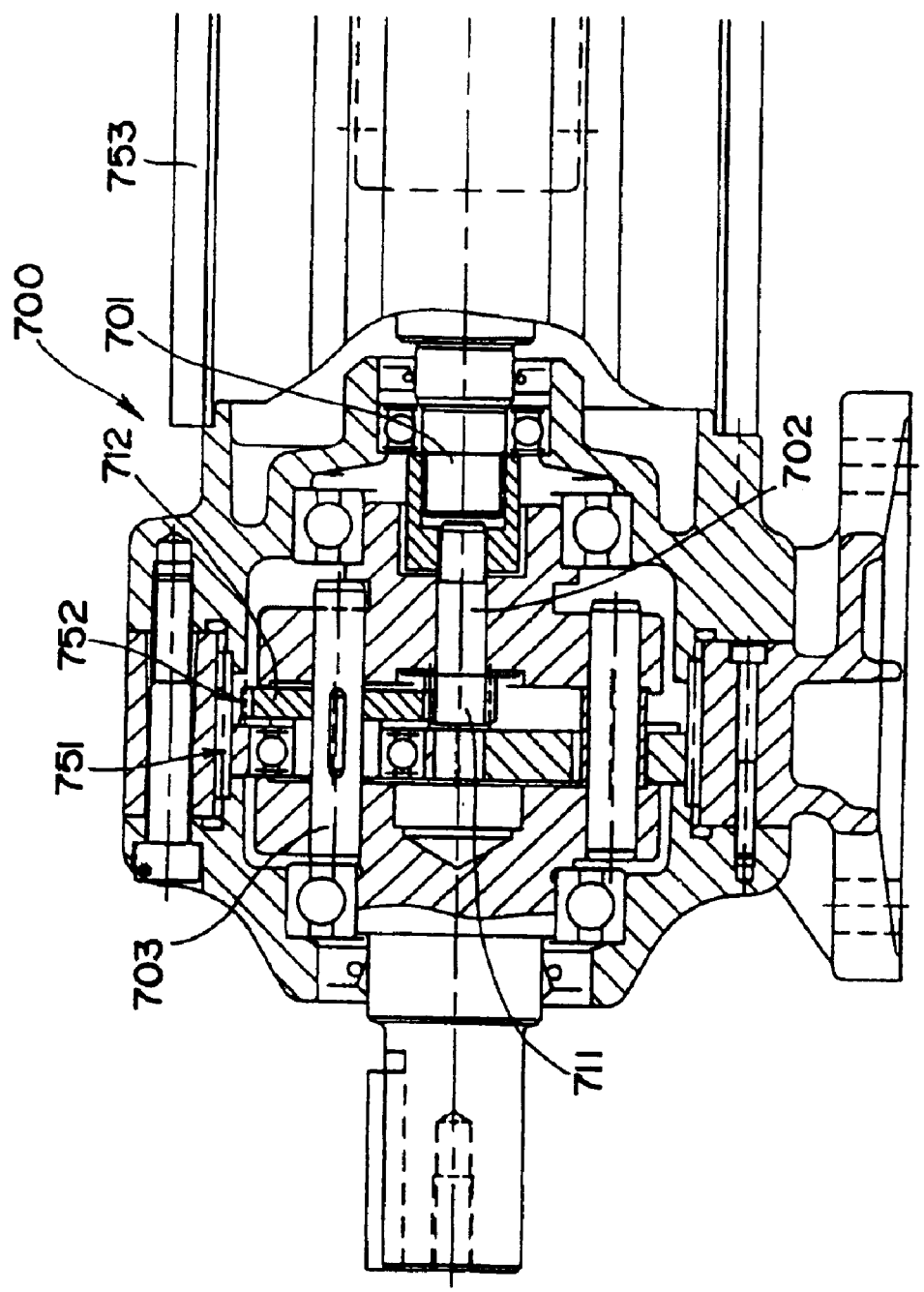
FIG. 20 is a sectional view of another geared motor used as a comparative example in the noise measurement test.

The geared motor of the (b) sample "C1+F(G)+M" is the type of geared motor 700 shown in FIG. 20. This geared motor 700 is one in which "the friction rollers (the sun roller 511 and the power-distributed rollers 512)" of FIG. 17 is replaced with "gears (a sun gear 711 and power-distributed gears 712)." More specifically, this geared motor 700 is configured so that power-distributed shafts 703 in an oscillating internal meshing planetary gear mechanism (C1) 751 of power-distributed shaft type are given input rotation by a gear transmission mechanism 752 [F(G)] consisting of the sun gear 711 and the power-distributed gears 712. The input shaft 702 arranged at the extremity of the sun gear 711 is spline-connected to the shaft 701 of a motor 753 (M).

The geared motor of the (c) sample "C1+F(T/D)+M" is the conventional type of geared motor 500 shown in FIG. 17. In this geared motor 500, the power-distributed shafts are given input rotation by the transmission mechanism of friction roller type [F(T/D)].

Figure 21:
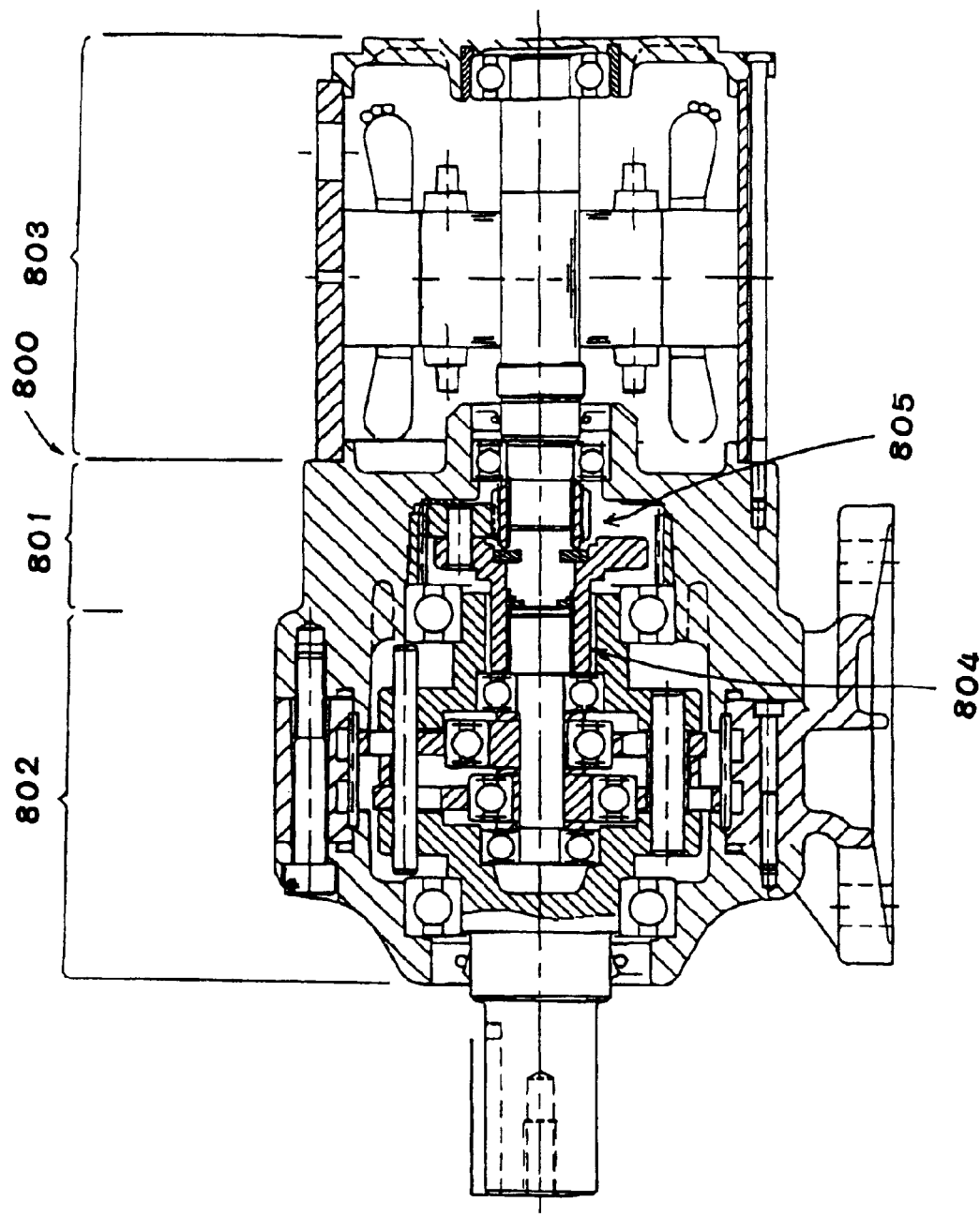
FIG. 21 is a sectional view of still another geared motor used as a comparative example in the noise measurement test.

The geared motor of the (d) sample "C1+P(G)+M" is the type of geared motor 800 shown in FIG. 21. This geared motor 800 has a planetary gear mechanism 801 [P (G) ] as the first-stage reduction unit and an oscillating internal meshing planetary gear mechanism 802 (C1) as the second-stage reduction unit. Both the coupling part 805 between the input shaft of the planetary gear mechanism 801 and the output shaft of a motor M and the coupling part 804 between the output shaft of the planetary gear mechanism 801 and the input shaft of the oscillating internal meshing planetary gear mechanism 802 have a floating connection structure.

The geared motor of the (e) sample "C1+P(T/D)A+M" is a geared motor similar to the type of driving apparatus of the present invention shown in FIG. 4. This geared motor is of the type which has a simple planetary roller mechanism (T/D) at the first stage and takes out the revolution component of the planetary rollers by means of retainers arranged on the carrier.

The geared motor of the (f) sample "C1+P(T/D)B+M" is a geared motor similar to the type of driving apparatus of the present invention shown in FIG. 4. This geared motor is of the type which has a simple planetary roller mechanism (T/D) and takes out the revolution component of the planetary rollers by means of pins arranged on the carrier.

[Test Condition and Method]

The condition and method of the measurement test are as follows:
(1) Measurement was performed under no load and under 100% load;
(2) Before measurement, running-in was performed for two minutes clockwise and two minutes counterclockwise under no load regardless of the lubricating system;
(3) The directions of rotation in measurement were both clockwise and counterclockwise;
(4) Measurement was performed with microphones placed at five locations, or above, on the left side of, and on the right side of the geared motor, in front of the low-speed shaft, and behind the motor, one meter away from the respective surfaces (the one meter excluding projections);
(5) Measurement was performed by switching a microphone selector to read data from a precision noise meter location by location;
(6) The measurement site was a soundproof chamber;
(7) For installation, a low-rigidity lightweight base, a harsh placement condition, was assumed. Incidentally, some were also measured as installed on an FC surface plate (cast iron). In either case, no space is left between the top surface of the base or surface plate and the sample machine;
(8) The load was given by a brony brake;
(9) Audibility was A-weighted; and
(10) The outputs of the noise meter were FFT-analyzed for noise spectrum measurement. The sampling mode then was 32-time SUM (averaging).

[Noise Measurements]

The table of FIG. 10 numerically shows the noise measurements. The graph of FIG. 11 shows differences in noise volume under the 100% load. Besides, the analyses of the noise spectra appear in FIGS. 12–15.

[Consideration 1 on Noise Measurements]

The following is consideration from the results of this measurement test. See the FIGS. 12–15.
(1) Initially, with reference to the case of the geared motor of (a), the gear type geared motor of power-distributed shaft type of (b) is higher in noise than (a). This seems due to being the power-distributed shaft type so that vibrations are mutually transmitted through the power-distributed shafts for overall resonance.
(2) Next, from the power-distributed shaft types, it is shown that the type of (c) in which the power-distributed transmission system is changed to the friction roller type is reduced in noise than (b). This seems ascribable to the successful vibration absorbing function at the contact surfaces of the friction rollers. Nevertheless, despite the use of the friction rollers, there is not much difference from the type of (a). This means that merely using friction rollers does not necessarily promise the effect of noise reduction.

(3) Next, it can be seen that the geared motor of (d), using the planetary gear mechanism at the prior stage, is considerably higher in noise as compared to the types of (a) to (c). The reason for this seems that the planetary gear mechanism itself has a number of meshing points of gears, and vibrations occurring in the many meshing points lift the overall noise level. This means that merely interposing a reduction unit of simple planetary type does not provide the effect of noise reduction, but may rather cause an increase in noise.

(4) On the contrary, it can be seen that the geared motors of (e) type and (f) type shown in the embodiment of the present invention have achieved a significant reduction in noise as compared to those of the other types. This seems ascribable mainly to the substitution of the friction rollers for the gears in the simple planetary types.

More specifically, due to being a planetary type, the geared motor of planetary gear type of (d) rather has a greater number of meshing points of gears for extremely higher noise. In the geared motors of the types of (e) and (f), the gears are replaced with the friction rollers to secure a number of frictional contact surfaces in turn, which seems to have enhanced the noise absorption effect with an overall reduction in noise.

(5) Next, as concerns the differences between the type of (c) and the types of (e) and (f), the power-distributed roller type of (c) can secure frictional contact surfaces as many as the types of (e) and (f) do, whereas it rather picks up the vibrations of the power-distributed shafts (described before). This seems to have hindered the effect of noise lowering. In contrast, the types of (e) and (f), due to being simple planetary types, are free from picking up unnecessary vibrations. This appears to have contributed to a reduction in noise.

(6) Moreover, when the installation mode was switched from the lightweight base to the surface plate, the type of (a) made significant changes while the types of (e) and (f) showed not much differences. This fact allows the following assumption. That is, in the type of (a), the geared motor has vibration of considerably high level in itself. When it is installed on the lightweight base, the lightweight base is thus vibrated (resonates) by the geared motor to produce high noise.

On the other hand, when it is installed on such an extremely strong counterpart in terms of rigidity as the surface plate, the vibration is suppressed by the installation, and thus the noise also decreases;

On the contrary, in the types of (e) and (f), the geared motors themselves are already controlled to a considerable extent in vibration level. Consequently, no difference arises from the difference in the installation mode or of the installation counterpart.

Whether this assumption is correct or not, it is essentially clear at least that in the cases of the present invention of (e) and (f), the vibration reducing effect prevails to such a level that no difference arises from the difference in the installation mode. In respect that this type of geared motor must always be installed on some kind of counterpart in practice, "being low in noise level irrespective of the counterpart" can be said to be a highly significant advantage.

(7) As can also be seen from the noise spectra, (e) and (f) are reduced in noise level almost across the frequency domain when compared to the others (a) to (d). This allows the consideration that both noise which tends to be sensed in the domain of higher frequencies and vibration which tends to be sensed in the domain of lower frequencies are reduced significantly.

Incidentally, while the coupling with the reduction units of internal meshing planetary gear structure is shown as data here, it has been confirmed that the same effect can also be obtained from the coupling with other reduction units. Then, that finding has originated the creation of the present invention.

Incidentally, in the foregoing embodiment, the T/D units 120 are mounted inside the covers 110 of the motors so as to ensure the integration as geared motors. Nevertheless, in order to intercept the transmission of vibration between the speed reducers and the motors through the covers 110, the covers of the speed reducers and motors and the housings of the T/D units may be deliberately separated for after coupling. In that case, for example, flanges may be formed on both sides of the housing of a T/D mechanism so that these flanges are connected to the speed reducer and the motor.

Such separation of the casings (including housings or covers) makes it possible to intercept the transmission of vibration between the motors and the speed reducers through the casings, thereby allowing a further "noise reduction." In this case, vibration absorbing means such as rubber can be interposed into the coupling parts of the respective casings for additional blocking of vibration transmission.

Moreover, in order to avoid the vibration transmission to exterior through the casings, a vibration absorbing member or a space may be interposed between the ring roller 123 of a simple planetary roller mechanism and the cover 110, instead of fixing the two directly.

This slightly lowers the integration as a geared motor, but allows complete interception among the three units, or the speed reducer, the simple planetary roller mechanism, and the motor, even in terms of power transmission paths and in terms of casings. As a result, vibration can be suppressed of the casings in particular. The resonance avoiding effect can thus be enhanced not only of the driving apparatus itself but also with the mating machine (member). Incidentally, when the casings of the three units are divided like this, the external mounting legs of the geared motor can be arranged on the casing of the simple planetary roller mechanism so that the transmission of vibration to the mating member in an installed state is further suppressed for an additional reduction in noise level.

In addition, since the driving apparatuses of the present invention have a T/D unit interposed therein, variations of the diameters of the respective rollers can be combined to facilitate developing a series of driving apparatuses having an extremely wide variety of reduction ratios.

That is, gear type speed reducers are structurally made of parts that are special one by one. Storing a number of types of parts all the time entails extremely high inventory cost, which is one of the big problems on the maker side. On the other hand, simple planetary roller mechanisms can be continuously changed in the roller diameters easily with slight additional machining alone. This means a wide scope of applications even with more individual, delicate adjustments in speed-change ratio.

Incidentally, the driving apparatuses GM1 to GM6 of the respective embodiments described above are lubricated by grease lubrication. The lubrication is shared between the first-stage T/D part and the second- and subsequent-stage reduction unit(s), which are typically separated to use different types of grease. Consequently, grease that is past a smaller temperature increase at the low-speed stage and is less worn (oxidized) can be supplied to the T/D part, or the high-speed stage, smoothly. Incidentally, detailed disclosure of the sharing of grease between a T/D part and a gear type speed reducer appears in Japanese Patent Laid-Open Publication No.Hei 11-3624225.

INDUSTRIAL APPLICABILITY

According to the series of motors with speed reducers of the present invention, a plurality of simple planetary roller mechanisms are used to constitute a plurality of medium-speed motor groups substantially. In addition, a plurality of types of speed reducers are made freely selectable and connectable to medium-speed motors of the same size. Consequently, the exertion of the speed-reducing function of the simple planetary roller mechanisms allows the reduction ratios on the speed-reducer side to be set smaller with margins accordingly. It becomes also possible to select the speed reducers more easily with consideration given to the terms of costs. Moreover, since the simple planetary roller mechanisms constituting the medium-speed motors exercise the first-stage reduction, it is also possible to extend the range of total reduction ratios of the motors with speed reducers easily. Furthermore, the simple planetary roller mechanisms can be fine adjusted in reduction ratio to provide a wider variation of reduction ratios, thereby meeting user demands for reduction ratios with flexibility and reliability.

Additionally, due to the presence of the simple planetary roller mechanisms between the motors and the speed reducers, the input rotation speed to the speed reducers can be set lower. The noise/vibration levels themselves occurring from the speed reducers can thus be reduced significantly. Besides, the vibrations that are being transmitted between the speed reducers and the motors (in particular, vibration in the rotational direction and vibration in the axial direction) can be absorbed by the mutual contact among the rollers of the simple planetary roller mechanisms. Consequently, it is possible to avoid complex resonance phenomena arising between the speed reducers and the motors, thereby allowing a significant reduction in the overall noise and vibration levels of the motors with speed reducers.

What is claimed is:

1. A plurality of selectable and configurable driving apparatuses, with at least one driving apparatus comprising:
   a motor having a first output shaft;
   a cover;
   a speed reducer; and
   a first simple planetary roller mechanism, said first simple planetary roller mechanism including a first ring roller, a plurality of first planetary rollers, and a first sun roller, said plurality of first planetary rollers being contiguous with an inner periphery of the first ring roller, and an outer periphery of the first sun roller,
   wherein the cover is fixed to an output end of the motor around the first output shaft, said first simple planetary roller mechanism is coupled to an inner periphery of the cover and connected to the motor through the first sun roller, thereby forming a configurable predetermined-speed motor, and wherein a plurality of types of speed reducers are selectable and connectable to a plurality of types of first simple planetary roller mechanisms through a first carrier of the speed reducer for synchronizing a revolution component of the speed reducer with a revolution component of the plurality of first planetary rollers.

2. The plurality of selectable and configurable driving apparatuses according to claim 1, wherein the plurality of first simple planetary roller mechanisms has first ring rollers of an equal diameter and a plurality of first planetary rollers and first sun rollers of different diameter ratios to provide different speed-change ratios.

3. The plurality of selectable and configurable driving apparatuses according to claim 1, wherein said first simple planetary roller mechanism has equal connecting dimensions to said motor and also has a different frame number.

4. The plurality of selectable and configurable driving apparatuses according to claim 1, wherein said speed reducer includes an orthogonal axis gear speed reducer using a bevel gear, and wherein the driving apparatus includes the motor and speed reducer for attaining a total reduction ratio in a range of $1/3$ to $1/60$ by using said orthogonal axis gear speed reducer and said first simple planetary roller mechanism.

5. The plurality of selectable and configurable driving apparatuses according to claim 1, wherein said first simple planetary roller mechanism is configured to be coupled to any one of a plurality of different motors.

6. The plurality of selectable and configurable driving apparatuses according to claim 1, wherein said predetermined-speed motor includes a medium-speed motor.

7. The plurality of selectable and configurable driving apparatuses according to claim 1, wherein the plurality of first planetary rollers includes at least three planetary rollers.

8. The plurality of selectable and configurable driving apparatuses according to claim 1, said speed reducer comprising:
   a casing, a second output shaft rotatably mounted on the casing through bearings, and a second simple planetary roller mechanism having an output side connected to the second output shaft, and the first carrier being connected to an input side of the second simple planetary roller mechanism.

9. The plurality of selectable and configurable driving apparatuses according to claim 8, said second simple planetary roller mechanism further comprising:
   a second sun roller, a second ring roller, a plurality of second planetary rollers and a second carrier, wherein the plurality of second planetary rollers is in rolling contact with an outer periphery of the second sun roller and an inner periphery of the second ring roller, and the second carrier is integral with an input end of the second output shaft.

10. The plurality of selectable and configurable driving apparatuses according to claim 1, said speed reducer comprising:
    a casing, a second output shaft rotatably mounted on the casing through bearings, an oscillating internal meshing gear structure having an output side connected to the second output shaft, and the first carrier being connected to an input side of the oscillating internal meshing gear structure.

11. The plurality of selectable and configurable driving apparatuses according to claim 10, said oscillating internal meshing planetary gear structure further comprising:
    an input shaft, an eccentric body, an internal gear, an external gear, and a second carrier,
    wherein the input shaft is connected to the first carrier through a spline, the eccentric body is mounted on an outer periphery of the input shaft, the external gear is fitted to both an outer periphery of the eccentric body through a bearing and an inner periphery of the internal gear, and wherein the second carrier is integral with an input end of the second output shaft.

12. The plurality of selectable and configurable driving apparatuses according to claim 1, said speed reducer comprising:

a casing, a second output shaft rotatably mounted on the casing through bearings, a bevel gear connected to the second output shaft, and a bevel pinion being connected to the first carrier and meshing with the bevel gear.

13. The plurality of selectable and configurable driving apparatuses according to claim 12, said bevel gear further comprising:

an input shaft being rotatably mounted on the casing orthogonal to the second output shaft, the first carrier being connected to one end of the input shaft by a spline, the bevel pinion being formed on another end of the input shaft, wherein the bevel gear is fixed to the second output shaft and meshes with the bevel pinion.

14. The plurality of selectable and configurable driving apparatuses according to claim 1, said speed reducer comprising:

a casing, a second output shaft rotatably mounted on the casing through bearings, a hypoid gear being coaxial and connected to the second output shaft, and a hypoid pinion being connected to the first carrier and meshing with the hypoid gear.

15. The plurality of selectable and configurable driving apparatuses according to claim 14, said hypoid gear further comprising:

an input shaft being orthogonal to the second output shaft and rotatably mounted on the casing and axially offset from a line passing through the center of the second output shaft, wherein the hypoid gear is fixed to the second output shaft and meshes with the hypoid pinion, and wherein the hypoid pinion is formed on one end of the input shaft and the first carrier is connected to another end of the input shaft by a spline.

16. The plurality of selectable and configurable driving apparatuses according to claim 1, said speed reducer comprising:

a casing, a second output shaft rotatably mounted on the casing, a pinion gear connected to the second output shaft, the first carrier being connected to a worm gear and the worm gear meshing with the pinion gear.

17. The plurality of selectable and configurable driving apparatuses according to claim 16, said pinion gear further comprising:

an input shaft having the worm gear thereon and rotatably meshing with the pinion gear, wherein the pinion gear is fixed to the second output shaft, and the first carrier is connected to one end of the input shaft by a spline.

18. A plurality of selectable and configurable driving apparatuses, with at least one driving apparatus comprising:

a motor having an output shaft;
a cover;
an output mechanism; and
a speed reducer,
said speed reducer including a ring roller, a plurality of planetary rollers, and a sun roller, said plurality of planetary rollers being contiguous with an inner periphery of the ring roller and an outer periphery of the sun roller,
wherein the cover is fixed to an output end of the motor around the output shaft, the speed reducer is coupled to an inner periphery of the cover and connected to the output shaft through the sun roller, thereby forming a configurable predetermined-speed motor, and wherein the output mechanism is selectable and connectable to a plurality of types of first simple planetary roller mechanisms through a carrier of the output mechanism for synchronizing a revolution component of the output mechanism with a revolution component of the plurality of planetary rollers.

19. A method of manufacturing a driving apparatus, said method comprising the steps of:

(a) selecting a motor unit from a selection group of motor units;
(b) fixing a cover to an output end of the selected motor unit around a motor unit output shaft;
(c) selecting a first simple planetary roller mechanism from a selection group of simple planetary roller mechanisms;
(d) coupling the selected first simple planetary roller mechanism to an inner periphery of the cover;
(e) selecting an output mechanism from a selection group of output mechanism units; and
(f) connecting the output mechanism to the selected motor unit through the cover,
wherein a combination of said first simple planetary roller mechanism and the motor unit forms a configurable predetermined-speed motor, wherein a plurality of output mechanisms are selectable and connectable to a plurality of configurable predetermined-speed motors.

20. The method of manufacturing a driving apparatus according to claim 19, the step of coupling said first simple planetary roller mechanism to an inner periphery of the cover further comprising the steps of:

fixing a ring roller to an inner periphery of a recess in a front face of the cover;
attaching a plurality of planetary rollers to an inner periphery of the ring roller;
engaging a sun roller with the plurality of planetary rollers, the sun roller being contiguous with an outer periphery of any one of the plurality of planetary rollers; and
connecting the sun roller to an extremity of the motor unit output shaft.

21. The method of manufacturing a driving apparatus according to claim 19, the step of connecting the output mechanism to the selected motor unit further comprising the steps of:

fitting carrier pins on a carrier of the output mechanism to a respective plurality of planetary rollers by inner rollers in the carrier; and
coupling a casing of the output mechanism to the cover.

22. The method of manufacturing a driving apparatus according to claim 20, the step of connecting the output mechanism to the selected motor unit further comprising the step of coupling a speed reducer to the predetermined-speed motor through a carrier for synchronizing a revolution component of the speed reducer with a revolution component of the plurality of planetary rollers.

23. The method of manufacturing a driving apparatus according to claim 20, the step of connecting the output mechanism to the cover further comprising the step of coupling a second simple planetary roller mechanism to the predetermined-speed motor through a carrier for synchronizing a revolution component of the second simple planetary roller mechanism with a revolution component of the plurality of planetary rollers.

24. The method of manufacturing a driving apparatus according to claim 20, the step of connecting the output mechanism to the selected motor unit further comprising the step of coupling an oscillating internal meshing planetary gear to the predetermined-speed motor through a carrier for synchronizing a revolution component of the oscillating internal meshing planetary gear with a revolution component of the plurality of planetary rollers.

25. The method of manufacturing a driving apparatus according to claim 20, the step of connecting the output mechanism to the selected motor unit further comprising the step of coupling a bevel gear to the predetermined-speed motor through a carrier for synchronizing a revolution component of the bevel gear with a revolution component of the plurality of planetary rollers.

26. The method of manufacturing a driving apparatus according to claim 20, the step of connecting the output mechanism to the selected motor unit further comprising the step of coupling a hypoid gear to the predetermined-speed motor through a carrier for synchronizing a revolution component of the hypoid gear with a revolution component of the plurality of planetary rollers.

27. The method of manufacturing a driving apparatus according to claim 20, the step of connecting the output mechanism to the selected motor unit further comprising the step of coupling a worm gear to the predetermined-speed motor through a carrier for synchronizing a revolution component of the worm gear with a revolution component of the plurality of planetary rollers.

28. A plurality of selectable and configurable driving apparatuses, with at least one driving apparatus including a motor having a motor output shaft, a cover around the output shaft, a simple planetary roller mechanism having a ring roller, a plurality of planetary rollers and a sun roller, and an output mechanism having a carrier, carrier pins and a casing, comprising:

first fixing means for fixing the cover to an output end of the motor, coupling means for coupling said simple planetary roller mechanism to an inner periphery of the cover, and first connecting means for connecting the output mechanism to the motor through the cover, wherein a combination of said simple planetary roller mechanism and the motor forms a configurable predetermined-speed motor, and wherein a plurality of output mechanisms are selectable and connectable to a plurality of configurable predetermined-speed motors.

29. The plurality of selectable and configurable driving apparatuses according to claim 28, said means for coupling said simple planetary roller mechanism further comprising:

second fixing means for fixing the ring roller to an inner periphery of a recess in a front face of the cover, attaching means for attaching the plurality of planetary rollers on an inner periphery of the ring roller, engaging means for engaging the sun roller with the plurality of planetary rollers, the sun roller being contiguous with an outer periphery of any one of the plurality of planetary rollers, and second connecting means for connecting the sun roller to an extremity of the motor output shaft.

\* \* \* \* \*